United States Patent
Lim et al.

(10) Patent No.: US 10,845,911 B2
(45) Date of Patent: Nov. 24, 2020

(54) FORCE SENSOR MEMBER AND DISPLAY DEVICE INCLUDING THE SAME

(71) Applicant: SAMSUNG DISPLAY CO., LTD., Yongin-si (KR)

(72) Inventors: Jae Ik Lim, Hwaseong-si (KR); Min Woo Kim, Hwaseong-si (KR); Won Sang Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/212,014

(22) Filed: Dec. 6, 2018

(65) Prior Publication Data

US 2019/0243501 A1    Aug. 8, 2019

(30) Foreign Application Priority Data

Feb. 8, 2018   (KR) .......................... 10-2018-0015452

(51) Int. Cl.
    *G06F 3/041*    (2006.01)

(52) U.S. Cl.
    CPC .......... *G06F 3/0414* (2013.01); *G06F 3/0412* (2013.01); *G06F 3/0416* (2013.01); *G06F 3/04142* (2019.05); *G06F 2203/04106* (2013.01)

(58) Field of Classification Search
    CPC .... G06F 3/0412; G06F 3/0414; G06F 3/0416; G06F 3/04142
    USPC .......................... 345/174, 589; 715/738; 1/1
    See application file for complete search history.

(56) References Cited

U.S. PATENT DOCUMENTS

| 7,868,778 | B2* | 1/2011 | Kenwright | H03K 17/9622 340/686.6 |
| 9,553,201 | B2* | 1/2017 | Ahn | H01L 29/78696 |
| 2008/0180604 | A1* | 7/2008 | Ohsawa | G02F 1/1396 349/96 |
| 2013/0026380 | A1* | 1/2013 | Tkaczyk | G01T 1/2928 250/370.13 |
| 2013/0249932 | A1* | 9/2013 | Siotis | G09G 3/20 345/589 |
| 2014/0092041 | A1* | 4/2014 | Ih | G06F 3/044 345/173 |
| 2014/0101560 | A1* | 4/2014 | Kwak | G06F 1/1652 715/738 |
| 2015/0035411 | A1* | 2/2015 | Kawamura | G01L 1/16 310/330 |

(Continued)

FOREIGN PATENT DOCUMENTS

| JP | 5384698 | 1/2014 |
| KR | 10-2016-0149982 | 12/2016 |

(Continued)

*Primary Examiner* — Prabodh M Dharia
(74) *Attorney, Agent, or Firm* — F. Chau & Associates, LLC

(57) ABSTRACT

A display device and a force sensor member provide an enhanced touch sensitivity. The display device includes: a display panel including a first base, and a light-emitting element disposed on the first base. A force sensor member is disposed on a rear surface of the display panel and overlaps with the display panel, wherein the force sensor member includes a first electrode and a second electrode spaced apart from each other, and a conductive polymer pattern disposed between the first electrode and the second electrode and spaced apart from the first electrode or the second electrode.

20 Claims, 24 Drawing Sheets

(56) References Cited

U.S. PATENT DOCUMENTS

| | | | |
|---|---|---|---|
| 2016/0202827 A1* | 7/2016 | Bae | G06F 3/044 |
| | | | 345/174 |
| 2017/0285255 A1* | 10/2017 | Nakamori | G02B 6/005 |
| 2017/0350773 A1* | 12/2017 | Ma | C09D 5/24 |
| 2018/0027893 A1* | 2/2018 | Bangera | A41D 31/245 |
| 2018/0095582 A1* | 4/2018 | Hwang | G06F 3/0416 |
| 2018/0157364 A1* | 6/2018 | Frey | H01H 65/00 |
| 2018/0228032 A1* | 8/2018 | Yamazaki | B32B 27/365 |
| 2019/0070075 A1* | 3/2019 | Hamilton | A61J 7/0418 |
| 2019/0187796 A1* | 6/2019 | Schreurs | G06F 3/016 |

FOREIGN PATENT DOCUMENTS

| | | |
|---|---|---|
| KR | 10-2017-0074002 | 6/2017 |
| KR | 10-2017-0119002 | 10/2017 |

* cited by examiner

FORCE SENSOR MEMBER AND DISPLAY DEVICE INCLUDING THE SAME

CROSS REFERENCE TO RELATED APPLICATIONS

This application claims priority from Korean Patent Application No. 10-2018-0015452, filed on Feb. 8, 2018 in the Korean Intellectual Property Office, under 35 § 119, the disclosure of which is incorporated by reference herein in its entirety.

TECHNICAL FIELD

Embodiments of the present inventive concept relate to a force sensor member of a touch screen for a display device including the same. More particularly, embodiments of the inventive concept relate to enhancing the operation of touch sensitivity of a touch screen of a display device.

DISCUSSION OF THE RELATED ART

Display devices have become increasingly popular as multimedia technology evolves. Accordingly, a variety of display devices, such as liquid-crystal display devices and organic light-emitting diode display devices, are currently being developed.

As an ever-increasing number of applications for electronic devices utilize display devices, a display device having a touch sensing capability is being researched. A display device having a touch sensing capability can recognize the information input by a user's touch operation on the display surface for displaying images, and may perform a particular operation using the information. Since images are displayed and a user's touch information are acquired in the same area of the display device having the touch sensing feature, the information can be exchanged efficiently between the user and the display device, and the user can operate the display device in an intuitive manner.

Such a display device having touch sensing capability can be employed by portable electronic devices such as smartphones, smart watches, tablet PCs and notebook computers, or large electronic devices such as televisions, monitors and digital information displays. User demand for such devices includes demand for an increase in the touch sensitivity of touch screens used with such display devices.

SUMMARY

Embodiments of the inventive concept may provide a display device with touch sensing capability. The information input by a user's touch operation includes information on whether or not the touch is made with the display device and information regarding the position of the touch. In addition, information detected by the display device may include whether a pressure has been applied to the display device by the touch, information on the magnitude of the touch pressure, or information on the position where the touch pressure is applied, etc. In other words, as the functions and applications of display devices are diversified, the display devices may acquire information based on the touch pressure. For example, by acquiring information on the touch pressure from the display surface of the display device, a user can control the power of the display device, can adjust the volume of the display device, or can perform a particular function of the display device. This construction makes it possible to eliminate physical buttons from the display device.

Embodiments of the inventive concept may provide a display device including a force sensor member capable of acquiring touch pressure information and/or touch position information on a user's touch operation.

Embodiments of the inventive concept also provide a force sensor member capable of acquiring touch pressure information and/or touch position information regarding a user's touch operation.

The teachings of the embodiments of the inventive concept will be better-appreciated by those of ordinary skill in the art upon review of the Detailed Description and Claims to follow.

According to an embodiment of the of the inventive concept, A display device includes: a display panel having a first base, and a light-emitting element disposed on the first base; and a force sensor member disposed on a rear surface of the display panel and overlapping with the display panel, wherein the force sensor member comprises a first electrode and a second electrode spaced apart from each other, and a conductive polymer pattern is disposed between the first electrode and the second electrode, and is spaced apart from the first electrode or the second electrode.

In an embodiment of the inventive concept, the display device may further include: a window glass disposed so as to be spaced apart from the force sensor member with the display panel interposed therebetween; a cushion sheet disposed so as to be spaced apart from the display panel with the force sensor member interposed therebetween; and a first adhesive member configured to couple the display panel with the force sensor member and in contact with the first electrode and the second electrode.

In an embodiment of the inventive concept, the display device may further include: a window glass disposed so as to be spaced apart from the force sensor member with the display panel interposed therebetween; a cushion sheet disposed so as to be spaced apart from the display panel with the force sensor member interposed therebetween; and a second adhesive member configured to couple the force sensor member with the cushion sheet and in contact with the first electrode and the second electrode.

In an embodiment of the inventive concept, the three sensor member may include a second base, a rigid anisotropic material layer disposed on the second base, the first electrode disposed on the rigid anisotropic material layer, the second electrode disposed on the rigid anisotropic material layer, and the conductive polymer pattern disposed directly on the rigid anisotropic material layer, wherein a width of the rigid anisotropic material layer may be greater than a width of the conductive polymer pattern.

In an embodiment of the inventive concept, the rigid anisotropic material layer may be made of an auxetic material having an insulating property, and a rigidity of the rigid anisotropic material layer in a pressure direction may be greater than a rigidity thereof in a direction perpendicular to the pressure direction.

In an embodiment of the inventive concept, a void may be defined between the first electrode and the conductive polymer pattern, and between the second electrode and the conductive polymer pattern.

In an embodiment of the inventive concept, in an initial state wherein where no pressure is applied, a thickness of the conductive polymer pattern may be greater than a thickness of the first electrode and a thickness of the second electrode.

In an embodiment of the inventive concept, the force sensor member may further include a second base for providing a space where the first electrode, the second electrode and the conductive polymer pattern are disposed, a surface of the second base may have a groove overlapping with the conductive polymer pattern.

In an embodiment of the inventive concept, the first electrode and the second electrode each may be extended in a first direction, the first electrode and the second electrode may be spaced apart from each other in a second direction intersecting with the first direction, the force sensor member may acquire a user's touch pressure information and touch position information, the touch position information may include coordinates of a position in the first direction, and the touch pressure information may include a pressure in a direction intersecting with the first direction and the second direction.

In an embodiment of the inventive concept, the display device may further include: a force sensor IC configured to send an input signal to the first electrode of the force sensor member and receive an output signal from the second electrode, a magnitude of a first output signal sent to the force sensor IC when a pressure is applied to a first position of the force sensor member in the first direction may be different from a magnitude of a second output signal sent to the force sensor IC when the pressure is applied to a second position of the force sensor member in the first direction.

In an embodiment of the inventive concept, the display device may include more than one of the conductive polymer pattern, wherein the conductive polymer pattern may be spaced apart from one another in the first direction.

In an embodiment of the inventive concept, the first electrode may have a zigzag shape tracing a path between the first electrode and the conductive polymer pattern, and the second electrode may have a zigzag shape tracing a path between the second electrode and the conductive polymer pattern.

In an embodiment of the inventive concept, the display device may further include: a force sensor IC configured to send an input signal to the first electrode of the force sensor member and electrically connected to the first electrode and the second electrode, there may be no conduction between the first electrode and the second electrode in an initial state where no pressure is applied to the display device.

In an embodiment of the inventive concept, the conductive polymer pattern may come in contact with the first electrode and the second electrode in a state where a pressure is applied to the display device, so that electrical conduction may be formed between the first electrode and the second electrode, the force sensor IC may receive an output signal from the second electrode, and the force sensor member may acquire touch pressure information and touch position information based on the input signal and the output signal.

In an embodiment of the inventive concept, the display device may further include: a printed circuit board for providing signals for displaying images to the display panel, the force sensor IC may be mounted on the printed circuit board.

In an embodiment of the inventive concept, the display panel may further include a display panel pad disposed on the first base and electrically connected to the light-emitting element, the force sensor member may include a second base providing a space where the first electrode, the second electrode and the conductive polymer pattern are disposed, a first force sensor pad disposed on the second base and electrically connected to the first electrode, and a second force sensor pad disposed on the second base and electrically connected to the second electrode, and the display panel pad, the first force sensor pad and the second force sensor pad may be connected to the printed circuit board.

In an embodiment of the inventive concept, the display area of the display panel may include a first display area having a flat surface and a second display area having a curved surface, and the first electrode or the second electrode may be at least partially located in the second display area.

According to an embodiment of the inventive concept, a display device may include: a display panel comprising a light-emitting element; and a force sensor member overlapping with the display panel, the force sensor member includes a base, a rigid anisotropic material layer disposed on the base, a first electrode disposed directly on the rigid anisotropic material layer, a second electrode disposed on the base and spaced apart from the first electrode, and a piezoelectric material interposed between the first electrode and the second electrode.

In an embodiment of the inventive concept, the force sensor member may acquire pressure information in a direction in which the first electrode is spaced apart from the second electrode, the rigid anisotropic material layer may be made of an auxetic material having an insulating property, and a rigidity of the rigid anisotropic material layer may be larger in a pressure direction than in a direction perpendicular to the pressure direction.

According to an embodiment of the inventive concept, a force sensor member includes: a base; a rigid anisotropic material layer disposed on the base; a first electrode disposed on the base and in contact with the rigid anisotropic material layer; and a second electrode disposed on the base and spaced apart from the first electrode.

According to an embodiment of the inventive concept, a display device includes a force sensor member capable of acquiring touch pressure information and/or touch position information on a user's touch operation, so that the display device can be controlled based on the touch pressure information or the touch position information.

It should be noted that embodiments of the inventive concept are not limited to those described above and in more detail herein below in conjunction with the drawings.

BRIEF DESCRIPTION OF THE DRAWINGS

A more complete appreciation of the embodiments of the inventive concept will be obtained as the by reference to the following detailed description when considered in connection with the accompanying drawings, wherein.

DETAILED DESCRIPTION OF THE EMBODIMENTS

Figure 1:
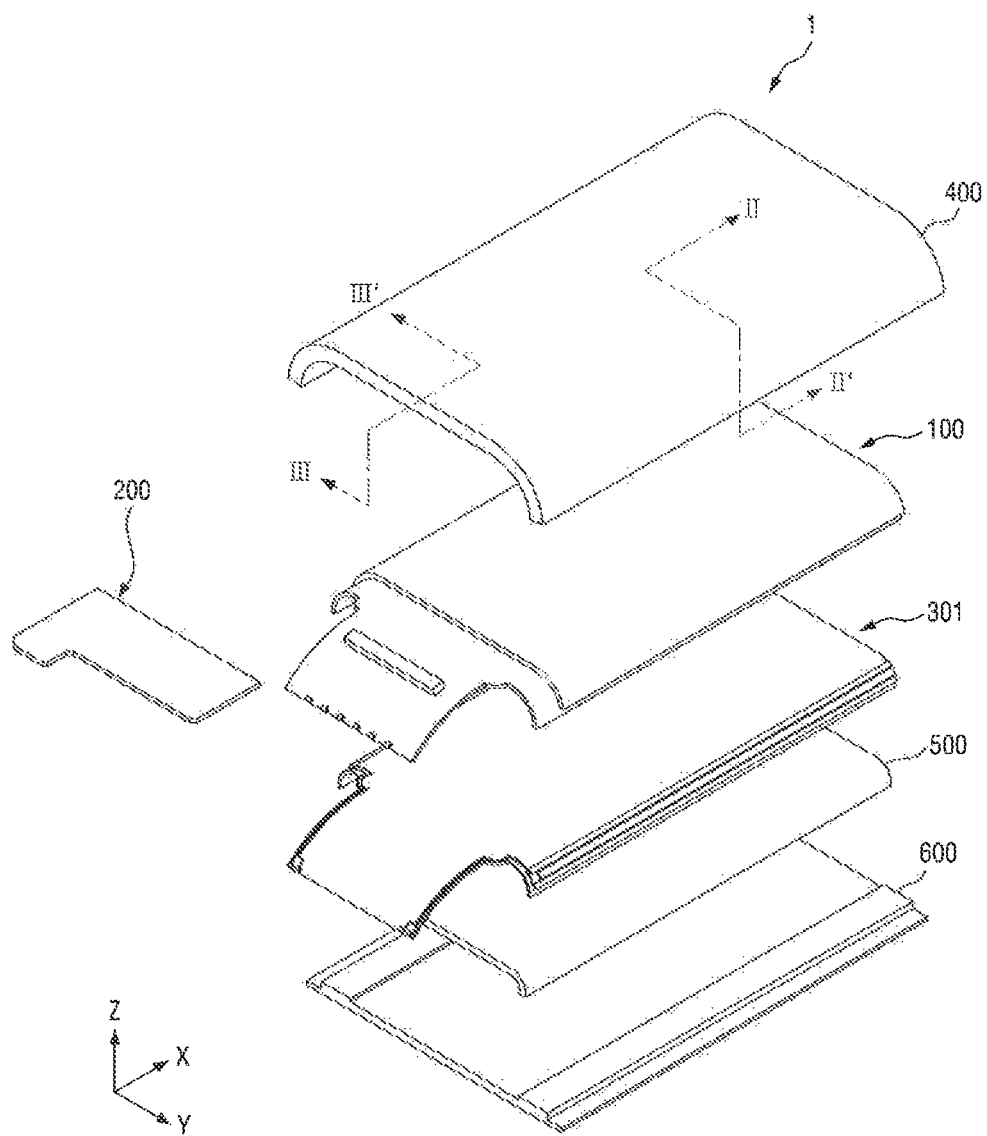
FIG. 1 is an exploded, perspective view of a display device according to an embodiment of the inventive concept.

In describing embodiments of the inventive concept illustrated in the drawings, specific terminology is employed for sake of clarity. However, embodiments of the inventive concept are not limited to the specific terminology so illustrated, and it is to be understood by a person of ordinary skill in the art that each specific element includes all technical equivalents which operate in a similar manner.

It will be understood that when an element or layer is referred to as being "on," "connected to" or "coupled to" another element or layer, the element or layer can be directly on, connected or coupled to another element or layer or intervening elements or layers. As used herein, the term "connected" may refer to elements being physically, electrically and/or fluidly connected to each other.

Like numbers may refer to like elements throughout the specification and the drawings.

It will be understood by a person of ordinary skill in the art that, although the terms first, second, third, etc., may be used herein to describe various elements, components, regions, layers and/or sections, these elements, components, regions, layers and/or sections may be otherwise enumerated. The aforementioned terms are used to distinguish one element, component, region, layer or section from another element, component, region, layer or section. Thus, a first element, component, region, layer or section discussed below could be termed a second element, component, region, layer or section without departing from the teachings of the embodiments of the inventive concept.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures.

As used herein, a first direction X refers to a direction in a plane, a second direction Y refers to a direction intersecting the first direction X in the plane, and a third direction Z refers to a direction perpendicular to the plane.

Hereinafter, embodiments of the inventive concept present disclosure will be described with reference to the accompanying drawings.

Figure 2:
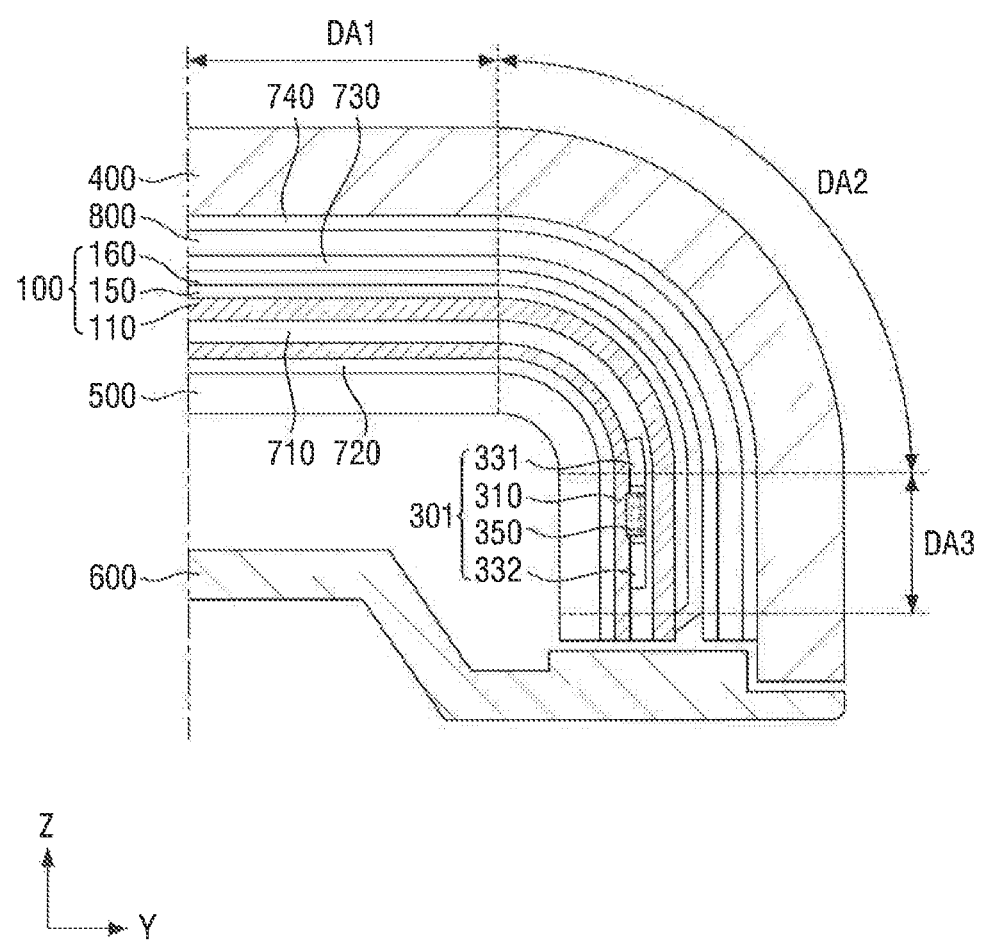
FIG. 2 is a cross-sectional view taken along line II-II' in FIG. 1.
Figure 3:
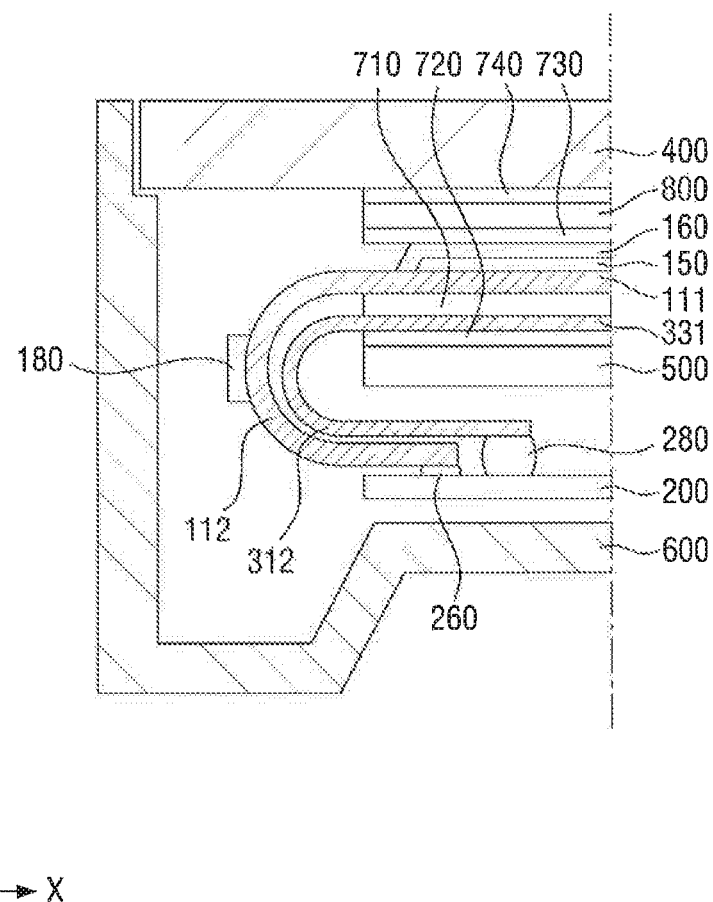
FIG. 3 is a cross-sectional view taken along line III-III' of FIG. 1.

FIG. 1 is an exploded, perspective view of a display device 1 according to an embodiment of the inventive concept, FIG. 2 is a cross-sectional view of the display device 1 taken along line II-II' of FIG. 1. FIG. 3 is a cross-sectional view of the display device 1 taken along line III-III' of FIG. 1.

Referring to FIGS. 1 to 3, a display device 1 according to an embodiment of the inventive concept includes a display panel 100, a printed circuit board 200, a window glass 400 and a back cover 600 and may further include a force sensor member 301. The display device 1 may be employed by a variety of portable electronic devices or large electronic devices.

The display device 1 can display images through display areas DA1, DA2 and DA3 (see FIG. 2). The display areas DA1, DA2 and DA3 include a first flat display area having a flat surface (e.g., a first display area DA1) and a curved display area having a curved surface (e.g., the second display area DA2) and may further include a second flat display area DA3 having a flat surface.

The curved display area DA2 may be distinguished from the first flat display area DA1 and the second flat display area DA3 with respect to a virtual bending line extending in a first direction X. The curved display area DA2 may be located relatively closer to an edge of the display device 1 than the first flat display area DA1 with respect to the second direction Y. In addition, the curved display area DA2 may be located between the first flat display area DA1 and the second flat display area DA3. The second flat display area DA3 may be located at, but is not limited to being, at the outermost side of the display area of the display device 1 in the second direction Y. The display surface formed by the first flat display area DA1 and the display surface formed by the second flat display area DA3 may not be on the same plane. For example, the display surface formed by the first flat display area DA1 and the display surface formed by the second flat display area DA3 may be substantially perpendicular to each other. As the display device 1 includes the first flat display area D1, as well as the curved display area DA2 forming a curved display surface, and the second flat display area D3 forming the display area at an angle different from that of the first flat display area DA1, a user may perceive the display device 1 as if there is no bezel area when the user looks at the display device 1 in the third direction Z. Further, the control function and the image display function of the display device 1 can be diversified using the curved surface display area DA2 and the second flat display area DA3.

The display panel 100 may be a panel-type member capable of displaying images. The display panel 100 may include bent portions. Hereinafter, the display panel 100 will be described in detail with reference to FIGS. 4 and 5. FIG.

Figure 4:
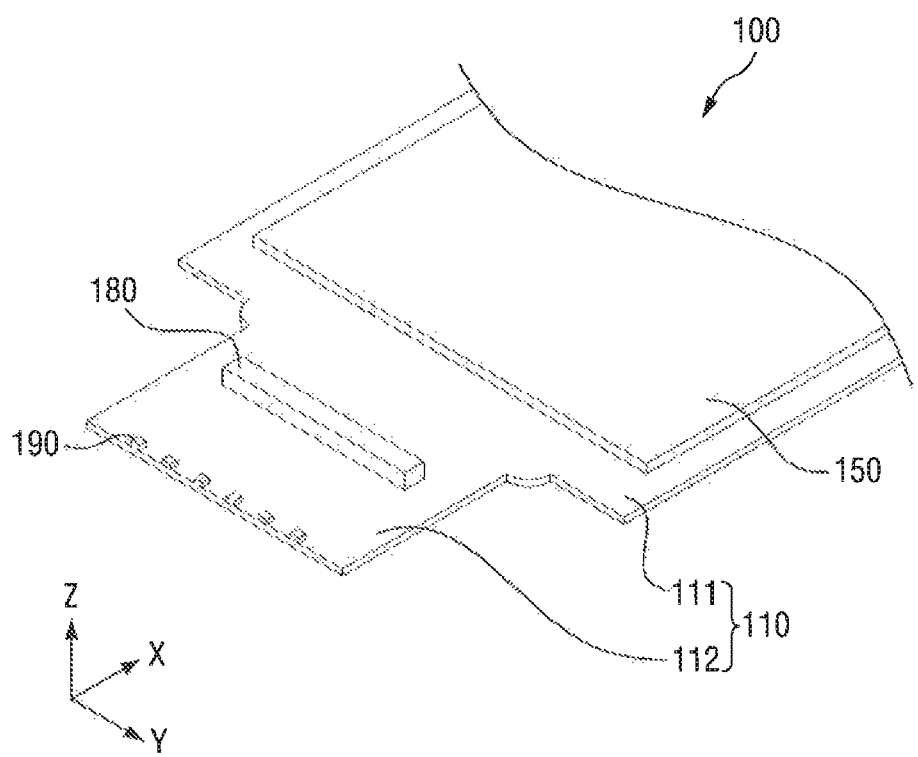
FIG. 4 is an exploded perspective view of the display panel of FIG. 1.
Figure 5:
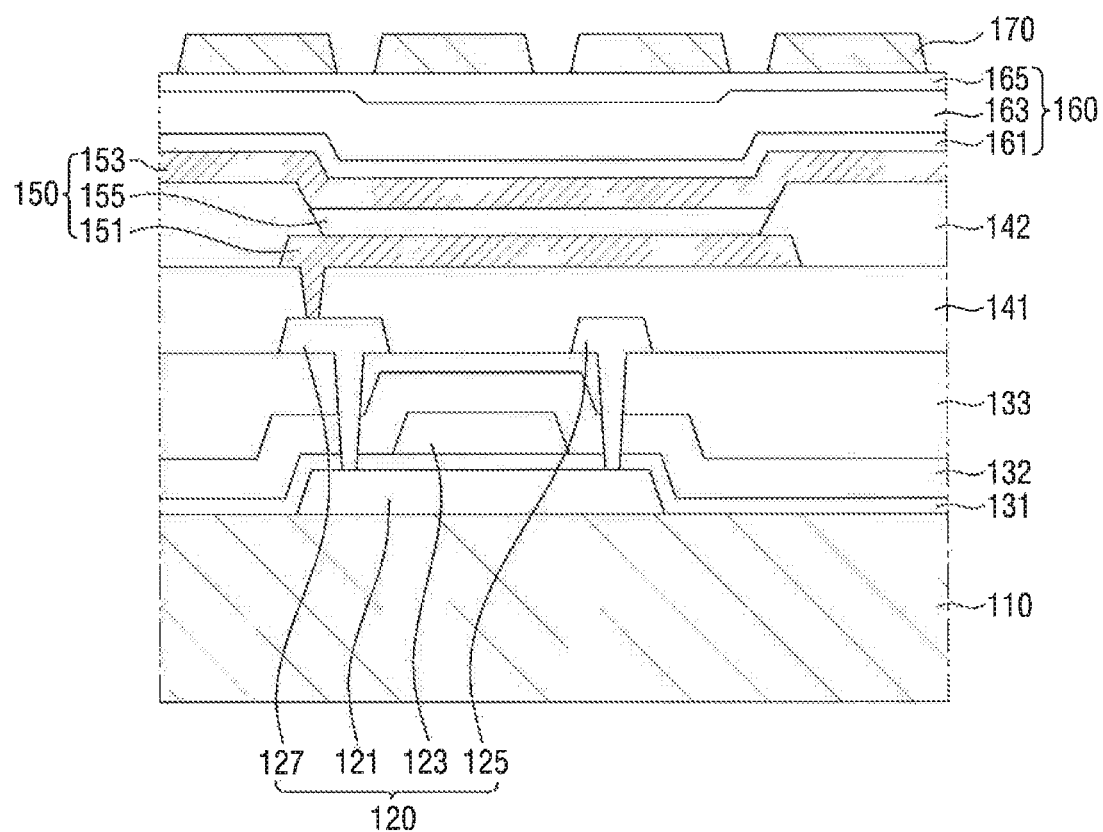
FIG. 5 is a cross-sectional view showing a pixel of the display panel of FIG. 4.

4 is a perspective view of the display panel 100 of the display device 1 of FIG. 1. FIG. 4 is a perspective view showing the display panel 100 with its first base 110 not being bent. FIG. 5 is a cross-sectional view showing a pixel of the display panel 100 of FIG. 4.

Referring to FIGS. 1 to 5, the display panel 100 includes a first base 110 and a light-emitting element 150, and may further include a wiring layer, an encapsulation layer 160, and a touch position sensing electrode 170. In some embodiments of the inventive concept, the display panel 100 may display images on the front side.

The first base 110 may be a supporting member for providing a space thereon where the wiring layer and the light-emitting element 150 may be disposed. The first base 110 may be a transparent or opaque insulating plate or an insulating film. In addition, the first base 110 may be constructed of a material having flexibility. For example, the first base 110 may include a glass material, a quartz material, etc. or may include a polymer material such as polyimide, polycarbonate, polyethylene terephthalate and polyacrylate.

In an embodiment of the inventive concept, the first base 110 may include a light-emitting element supporting portion 111 for providing a space in which the light-emitting element 150 is disposed, and a display panel pad forming portion 112 that protrudes from the light-emitting element supporting portion 111, in which a drive integrated circuit IC 180 is disposed and display panel pads 190 connected to the printed circuit board 200 are disposed (see FIG. 3). Although FIG. 4 shows that the first base 110 as being substantially flat for convenience of illustration, the first base 110 may be partially bent, for example, as shown in FIG. 1. For example, the light-emitting element supporting portion 111 may be bent at least partially in the second direction Y to form the curved display area DA2 and the second flat display area DA3. The display panel pad forming portion 112 may be bent at least in the first direction X and positioned on the rear side of the light-emitting element supporting portion 111 when the display device 1 is assembled.

As shown in FIG. 5, a thin-film transistor 120 and a wiring layer including wirings (not shown) for providing driving signals to the thin-film transistor 120 may be disposed on the light-emitting element supporting portion 111 of the first base 110. The thin-film transistor 120 may include a plurality of patterns, such as, for example, an active pattern 121 forming a channel, a gate pattern 123 serving as a control terminal, a drain pattern 125 serving as an input terminal, and a source pattern 127 serving as an output terminal. The thin-film transistor 120 may be a driving transistor configured to control the amount of current flowing through the channel region of the active pattern 121 to control the amount of light emitted by the light-emitting element 150 in a pixel. Although not shown in the drawings, the gate pattern 123 may be electrically connected to an output terminal of a switching transistor (not shown) for controlling (e.g., turning on/off) of the respective pixel to receive a control signal. The drain pattern 125 may be electrically connected to a driving voltage line (not shown) to receive a driving voltage. A first insulating layer 131 may be interposed between the active pattern 121 and the gate pattern 123. A plurality of insulating layers may include a second insulating layer 132 and a third insulating layer 133 may be interposed between the gate pattern 123 and the drain pattern 125 and between the gate pattern 123 and the source pattern 127. Each of the first insulating layer 131, the second insulating layer 132 and the third insulating layer 133 may include at least one of silicon nitride, silicon oxide, silicon nitride oxide and silicon oxynitride.

A step compensation layer 141 may be disposed on the thin-film transistor 120. The step compensation layer 141 may reduce level differences created by the elements disposed on the first base 110 to provide a space where the light-emitting element 150 is to be disposed stably. The material of the step compensation layer 141 is not particularly limited as long as it has insulation property and can cover level differences. For example, the step compensation layer 141 may include an organic material such as, for example, an acrylic resin, an epoxy resin, an imide resin, a cardo resin and an ester resin. A person of ordinary skill in the art should understand that the material of the step compensation layer 141 is not limited to the aforementioned organic materials.

The light-emitting element 150 may be disposed on the step compensation layer 141. The light-emitting element 150 may be disposed (e.g. arranged) in one or more of the first flat display area DA1, the curved display area DA2 and the second flat display area DA3. By arranging the light-emitting element in all of the aforementioned areas, an active area is formed in which images are displayed. Further, the light-emitting element 150 may be disposed in each of the pixels. In an embodiment of the inventive concept, the light-emitting element 150 may be an organic light-emitting element including an anode electrode 151, a cathode electrode 153 facing the anode electrode 151, and an organic emission layer 155 interposed therebetween. The light-emitting element 150 may emit a blue light, a green light or a red light as a result of fluorescence or phosphorescence depending on the material or stack structure of the organic light-emitting element 155, or may emit a white light. The anode electrode 151 may be electrically connected to the source pattern 127 of the thin-film transistor 120. The anode electrode 151 may be connected to each of the pixels, and there may be a pixel electrode that individually receives a driving signal. The cathode electrode 153 may be a common electrode disposed across the plurality of pixels. The anode electrode 151 and the cathode electrode 153 may be transparent or opaque. The organic light-emitting layer 155 may be disposed between the anode electrode 151 and the cathode electrode 153 to recombine holes and electrons from the anode 151 and the cathode 153 to form excitons. As the excitons are relaxed to the ground state, light can be emitted. Although not shown in the drawings, functional layers such as a hole controlling layer, an electron controlling layer and a charge generating layer may be further interposed between the anode electrode 151 and the cathode electrode 153, to increase the luminous efficiency of the light-emitting element 150.

In some embodiments of the inventive concept, a pixel defining layer 142 may be disposed on the anode electrode 151. The pixel defining layer 142 may serve to separate a pixel from another. The pixel defining layer 142 may have an opening exposing a part of the surface of the anode electrode 151. The organic emission layer 155 and the cathode electrode 153 may be disposed on the pixel defining layer 142. The pixel defining layer 142 may include an organic material such as an acrylic resin, an epoxy resin, an imide resin and an ester resin.

The encapsulation layer 160 may be disposed on the light-emitting element 150. The encapsulation layer 160 can prevent moisture or air from the outside to permeate into the display device 1 and damage the light-emitting element 150 or change its characteristics. In an embodiment of the inventive concept, the encapsulation layer 160 may include one or more inorganic encapsulation layers 161, 165, and at least one organic encapsulation layer 163 stacked on one another. For example, the inorganic encapsulation layers 161 and 165 and the organic encapsulation layer 163 may be alternately stacked on one another. Although FIG. 5 shows the encapsulation layer 160 made up of three layers, a person of ordinary skill in the art should understand that the encapsulation layer 160 shown and described is merely illustrative. There can be more encapsulation layers, or few encapsulation layers, and the type (inorganic and organic), or an order in which the layers are stacked may be different than shown in FIG. 5, In some embodiments of the inventive concept, the lower and upper layers of the encapsulation layer 160 may be inorganic encapsulation layers 161, 165, respectively, comprising inorganic materials. For example, the first inorganic encapsulation layer 161 may come in contact with the cathode electrode 153. The second inorganic encapsulation layer 165 may come in contact with the touch position sensing electrode 170. Each of the first inorganic encapsulation layer 161 and the second inorganic encapsulation layer 165 may include, for example, silicon nitride, silicon oxide, silicon oxynitride, or silicon oxynitride. A person of ordinary skill in the art should understand and appreciate that other materials may be used.

The touch position sensing electrode 170 may be disposed on the second inorganic encapsulation layer 165. The touch position sensing electrode 170 may be configured to acquire touch position information according to a user's touch operation.

The drive IC 180 and the display panel pads 190 (e.g., see FIG. 4) may be disposed on the display panel pad forming portion 112 of the first base 110.

When the display panel pad forming portion 112 of the first base 110 is bent in the first direction X, the drive IC 180 may be disposed on the convex surface of the first base 110 (see FIG. 1). The drive IC 180 may generate and provide a data signal for displaying images on the display panel 100 based on a driving signal provided from an external driving element, e.g., the printed circuit board 200 (see FIG. 6). Although not shown in the drawings, wirings (not shown) for electrically connecting the thin-film transistor 120 or the light-emitting element 150 with the drive IC 180 may be further disposed on the first base 110.

With reference to FIG. 4, the display panel pads 190 may be further disposed on the display panel pad forming portion 112 of the first base 110. The display panel pads 190 may electrically connect the display panel 100 with the printed circuit board 200. Although FIG. 4 illustrates that the display panel pads 190 are formed through a separate electrode having an expanded area, in an embodiment of the inventive concept, the display panel pads 190 may be formed by extending the ends of the wiring. Although not shown in the drawings, the wirings (not shown) may be further disposed on the first base 110 for electrically connecting the display panel pads 190 with the drive IC 180, or by electrically connecting the display panel pads 190 with the thin-film transistor 120 or the light-emitting element 150.

Figure 6:
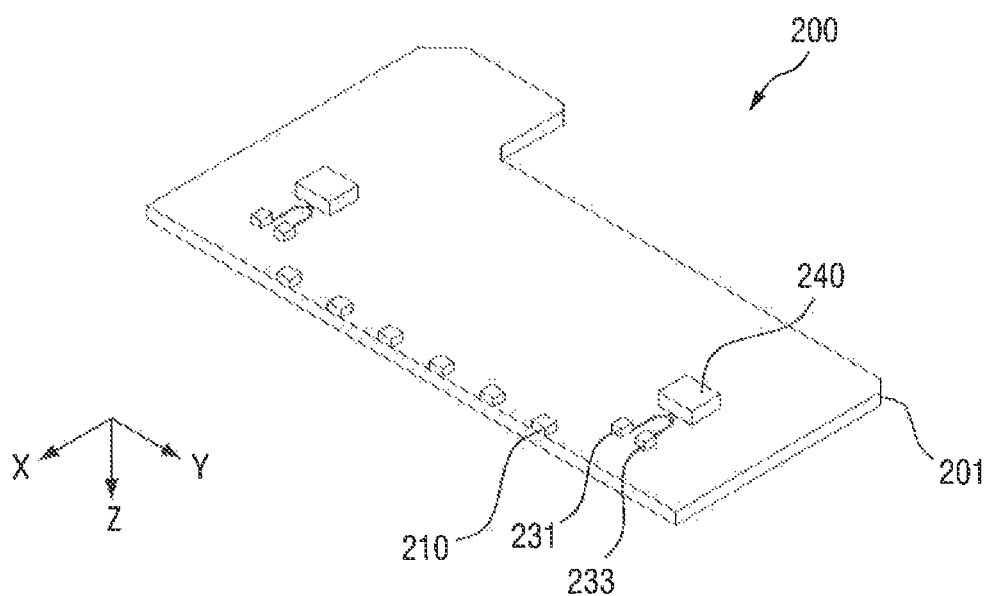
FIG. 6 is a perspective view showing the rear side of the printed circuit board of FIG. 1.

Next, the printed circuit board 200 will be described. FIG. 6 is a perspective view showing the rear side of the printed circuit board 200 of the display device 1 of FIG. 1. When the display device 1 is assembled, the printed circuit board 200 may be positioned on the rear side of the first base 110 of the display panel 100. The printed circuit board 200 may generate, transmit, or modulate signals for displaying images used for displaying images on the display device 1 of the display panel 100 and provide them to the display panel 100.

Referring to FIGS. 1 to 6, the printed circuit board 200 may include a base substrate 201, a force sensor integrated circuit IC 240, and connecting pads 231, 233 and 210. The base substrate 201 of the printed circuit board 200 may include an insulating material. On the surface of the base substrate 201, a conductive circuit pattern may be printed to electrically connect the force sensor IC 240, the pads 231, 233 and 210 and additional ICs (not shown) used for driving the display device 1 with one another.

As shown in FIG. 6, the force sensor IC 240 may be disposed on a rear surface ( ) of the base substrate 201. The force sensor IC 240 may receive input signals from the force sensor member 301 (see FIG. 7) described below, may receive output signals from the force sensor member 301, may acquire information regarding the touch pressure (touch pressure information) based on the input signals and the output signals, may acquire information regarding the touch position (touch position information), and/or may generate signals for the operation of the display device 1 based on the touch pressure information and the touch position information.

In addition, on the rear surface of the base substrate 201, the first output pad 231 and the second output pad 233 for electrically connecting to the force sensor member 301 and a third output pad 210 for electrically connecting to the display panel 100 may be disposed. For example, the first output pad 231 may be connected to a first force sensor pad 371 of the force sensor member 301 via a first anisotropic conductive adhesive 280 (see FIG. 3). The second output pad 233 may be connected to a second force sensor pad 372 of the force sensor member 301 via a second anisotropic conductive adhesive (not shown). The third output pad 210 may be connected to the display panel pads 190 (FIG. 4) of the display panel 100 via a third anisotropic conductive adhesive 260 (FIG. 3). Each of the first output pad 231 and the second output pad 233 may be electrically connected to the force sensor IC 240.

The force sensor member 301 may be disposed on the rear surface of the display panel 100. The force sensor member 301 may be coupled with the display panel 100 via a first adhesive member 710 (see FIG. 3). The first adhesive member 710 may include an optical transparent adhesive such as a double-sided tape, an optical transparent resin such as a photo-curable resin and a thermosetting resin, or a pressure-sensitive adhesive. The first adhesive member 710 may come in contact with and be coupled to a first electrode 331, a second electrode 332 and a conductive polymer pattern 350 of the force sensor member 301. In addition, the first adhesive member 710 may be n contact with the second base 310 of the force sensor member 301. It is understood that the first adhesive member 710 is not limited to the arrangement described herein. The force sensor member 301 will be described later in more detail.

The window glass 400 (see FIGS. 2 and 4) may be disposed on the front surface of the display panel 100. The window glass 400 may cover the upper surface of the display panel 100 to protect the display panel 100 while forming the exterior of the display device 1. In addition, the window glass 400 may form a display surface of the display device 1 on which images are displayed and also form a touch surface on which a user's touch operation is made, e.g., a contact made between the user and the display device 1. A person of ordinary skill in the art also understands and appreciates that contact may be made by a stylus manipulated by the user, as well as an electronic pen. The window glass 400 may be bent at least partially in the second direction Y, like the display panel 100. For example, the window glass 400 may be bent at least partially in the second direction Y to form the curved display area DA2 shown in FIG. 2. Furthermore, the window glass 400 may form the second flat display area DA3. In this case, the window glass 400 may form the upper surface of the exterior of the display device 1, and also may form the side surfaces of the exterior of the display device 1. In addition, the user may input a touch operation through the side surfaces as well as the upper surface of the display device 1. The window glass 400 may include a material having high transmittance and excellent strength such as glass, sapphire and polymer substrates.

A cushion sheet 500 may be disposed on the rear surface of the force sensor member 301. As shown in FIG. 2, the cushion sheet 500 may be bent at least partially in the second direction Y, similar to the display panel 100. For example, the cushion sheet 500 may be disposed in at least one of the first flat display area DA1, the curved display area DA2 and the third flat display area D3 of the display device 1. It is also possible there could be more than one cushion sheet that corresponds to a particular display area, respectively.

The cushion sheet 500 can suppress damage to the display panel 100 from an external impact. For example, the cushion sheet 500 can absorb at least a part of an external impact or disperse an external impact over a large area to thereby protect the display panel 100. The material of the cushion sheet 500 is not particularly limited as long as it is advantageously used for absorbing and/or dispersing an impact. For example, the material of the cushion sheet 500 may include a polymer material such as a urethane-based resin, a carbonate-based resin, a propylene-based resin and an ethylene-based resin, a rubber-based material or a foam-molded product thereof, just to name a few non-limiting examples. The cushion sheet 500 may be coupled with the force sensor member 301 via the second adhesive member 720. The second adhesive member 720 may include an optical transparent adhesive, an optical transparent resin, or a pressure-sensitive adhesive. The second adhesive member 720 may be in contact with the second base 310 of the force sensor member 301 to be coupled with it, but the embodiments of the inventive concept are not limited thereto.

In some embodiments of the inventive concept, one or more functional sheets (not shown) may be further disposed on the rear side of the cushion sheet 500. The functional sheets may include at least one or more of a strength reinforcing sheet, a heat dissipation sheet, an electromagnetic wave shielding sheet and/or a light transmission shielding sheet.

The back cover 600 may be disposed on the rear surface of the cushion sheet 500. The back cover 600 may cover and protect the display panel 100, the printed circuit board 200 and other elements utilized for driving the display device 1. The back cover 600 may include a material having good strength and rigidity such as a polymer material and/or a metal material. For example, the back cover 600 may include a metal material such as aluminum, nickel, or an alloy thereof. Both edges of the back cover 600 in the second direction Y may have a structure in which the display panel 100 and the window glass 400 bent in the second direction Y can be seated and coupled.

In some embodiments of the inventive concept, a polarizing member 800 may be further disposed between the display panel 100 and the window glass 400. The polarizing member 800 (FIG. 2) can enhance the outdoor visibility of the display device 1. For example, the polarizing member 800 can prevent reflection of external light from being perceived by a user by converting the incident light from an unpolarized state into a circularly polarized state and blocking the circularly polarized light from being reflected and exiting. Although FIG. 2 and the like may show the polarizing member 800 made up of a single layer, in an embodiment of the inventive concept, the polarizing member 800 may have a stacked structure of a linear polarizing member (not shown) and/or a phase retarding member. A third adhesive member 730 may be interposed between the polarizing member 800 and the display panel 100 to couple them. A fourth adhesive member 740 may be interposed between the polarizing member 800 and the window glass 400 to couple them opposite surfaces of the fourth adhesive member 740. For example, the third adhesive member 730 may come in contact with the touch position sensing electrode 170 and the polarizing member 800 of the display panel 100, and the fourth adhesive member 740 may come in contact with the polarizing member 800 and the window glass 800. The third adhesive member 730 and the fourth adhesive member 740 may each include an optical transparent adhesive, an optical transparent resin, or a pressure-sensitive adhesive.

Figure 7:
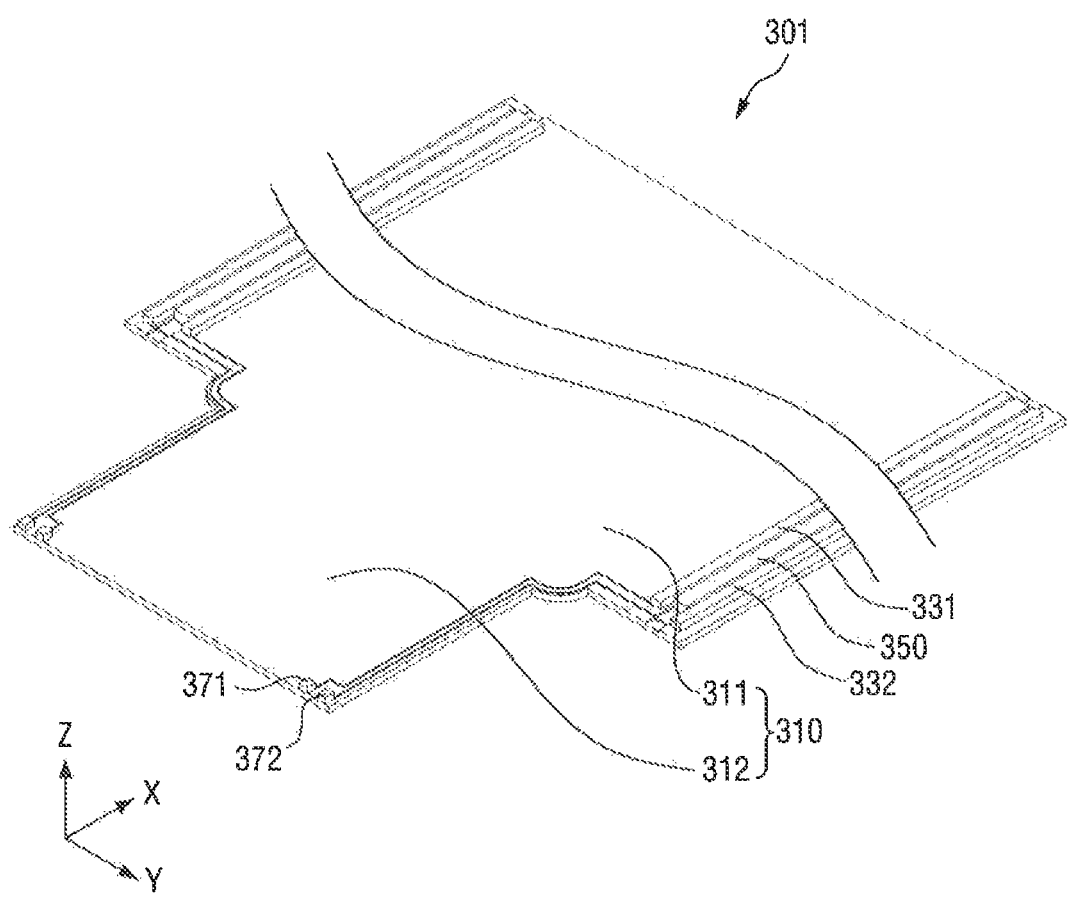
FIG. 7 is a perspective view of the force sensor member of FIG. 1.
Figure 8:
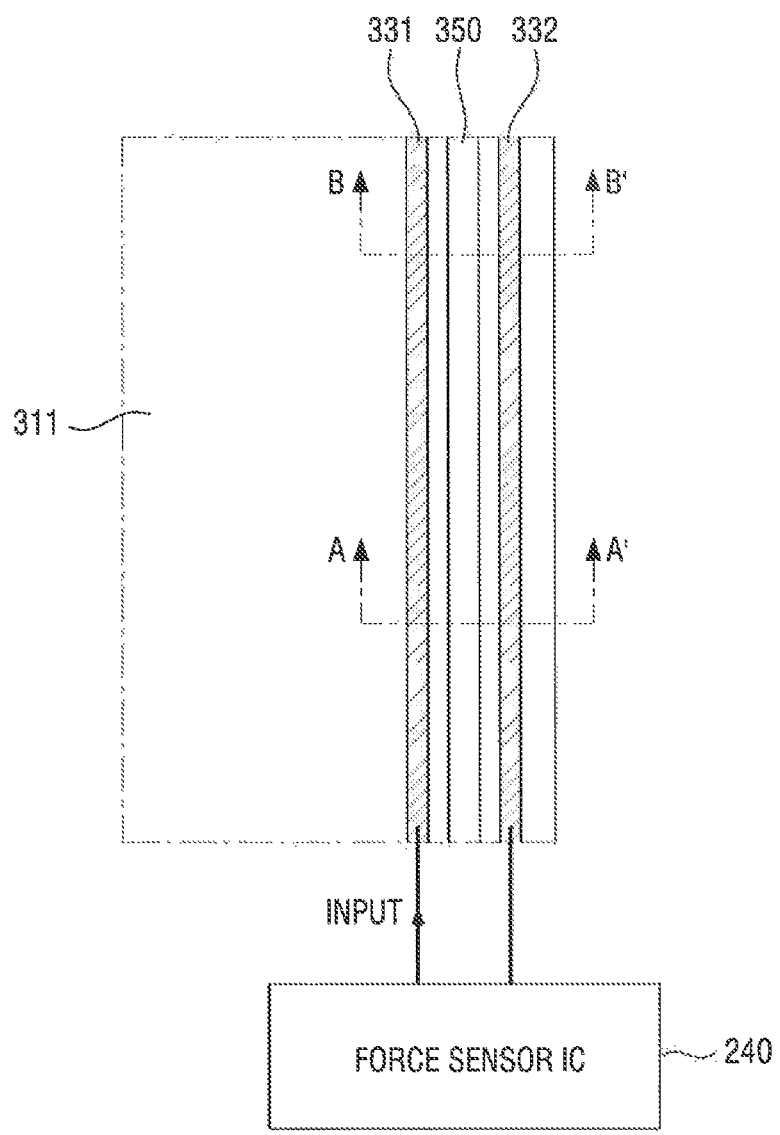
FIG. 8 is a schematic view for illustrating the operation of the force sensor member in an initial state when no pressure is applied.
Figure 9:
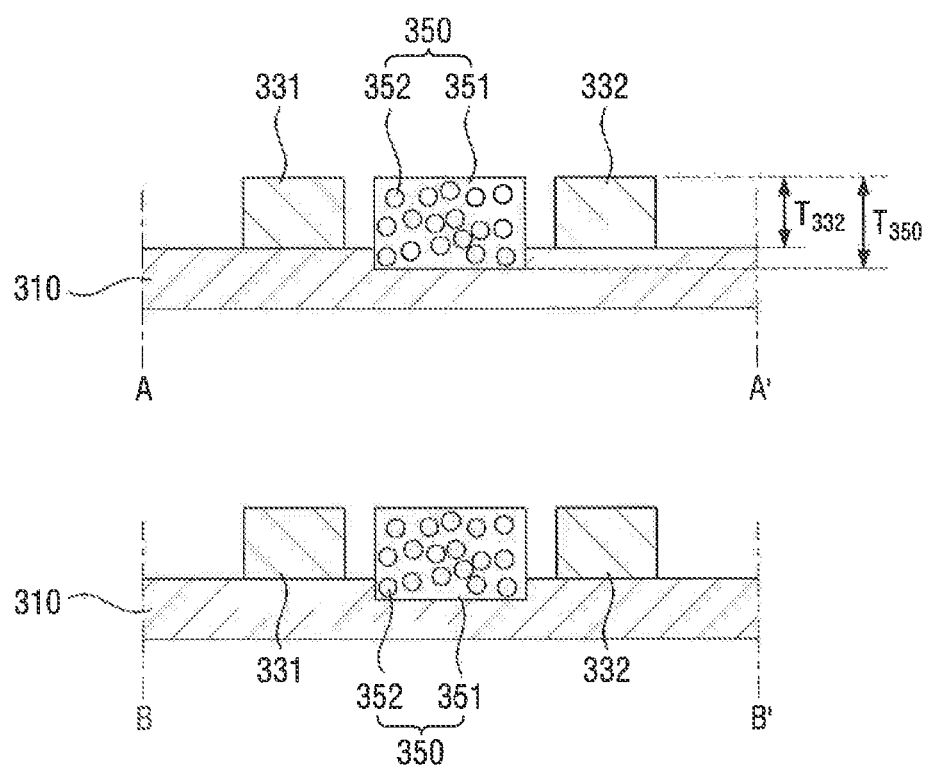
FIG. 9 is cross-sectional views taken along line A-A' and line B-B' of FIG. 8, respectively.

Hereinafter, the force sensor member 301 will be described in more detail with reference to FIGS. 7, 8, and 9. FIG. 7 is a perspective view of the force sensor member 301 of the display device 1 of FIG. 1. FIG. 8 is a schematic view for illustrating the operation of the force sensor member 301 in an initial state when no pressure is applied. FIG. 9 is cross-sectional views of the force sensor member 301 of FIG. 8 taken along line A-A' and line B-B' respectively.

The force sensor member 301 may acquire information on a user's touch operation. For example, the force sensor member 301 may acquire information on whether pressure has been applied via the user's touch operation or information on the magnitude of the touch pressure, and may further acquire information on the position where the pressure is applied. The force sensor member 301 may include the second base 310 (FIG. 7), and a first electrode 331, a second electrode 332 and a conductive polymer pattern 350 disposed on the second base 310 (see also FIG. 8).

The second base 310 may be a supporting member that provides a space thereon in which the first electrode 331, the second electrode 332 and the conductive polymer pattern 350 may be disposed. The second base 310 may be a transparent insulating plate or insulating film, or an opaque insulating plate or insulating film. In addition, the second base 310 may have a flexible structure. For example, the second base 310 may include a polymeric material such as polyethylene terephthalate, polyimide and polycarbonate.

In an embodiment of the inventive concept, the second base 310 may include a force sensor supporting portion 311 that provides a space where the first electrode 331, the second electrode 332 and the conductive polymer pattern 350 are disposed, and a force sensor pad forming portion 312 protruding from the force sensor supporting portion 311, in which a first force sensor pad 371 and a second force sensor pad 372 connected to the printed circuit board 200 are disposed. Although FIG. 7 shows that the second base 310 as being unfolded (e.g., flat) for convenience of illustration, the second base 310 may be partially bent. For example, the force sensor supporting portion 311 may be bent at least partially in the second direction Y and may be at least partially located in the curved display area DA2 and the second flat display area DA3. In addition, the force sensor pad forming portion 312 may be bent at least in the first direction X and positioned on the rear side of the force sensor supporting portion 311 when the display device 1 is assembled.

With continued reference to FIG. 7, the first electrode 331, the second electrode 332 and the conductive polymer pattern 350 may be disposed on the force sensor supporting portion 311 of the second base 310.

The first electrode 331 and the second electrode 332 may be extended generally in the first direction X. As can be seen in FIG. 8, the first electrode 331 and the second electrode 332 may be spaced apart from each other. For example, the first electrode 331 and the second electrode 332 may be spaced apart in the second direction Y wherein the second base 310 is not bent. When the second base 310 is bent in the second direction Y, the first electrode 331 and/or the second electrode 332 may be at least partially located in the curved display area DA2 of the display device 1. In addition, the conductive polymer pattern 350 may be located in the second flat display area DA3 of the display device 1.

In an initial state when no pressure is applied, there may be no conduction between the first electrode 331 and the second electrode 332. For example, the first electrode 331 and the second electrode 332 may not be in contact with each other but may be mutually electrically open. For example, the first electrode 331, the force sensor IC 240 and the second electrode 332 may complete a single circuit, and in the initial state, the circuit may be in an open state. The thickness of the first electrode 331 may be substantially equal to the thickness of the second electrode 332.

The first electrode 331 and the second electrode 332 may be electrically connected to the force sensor IC 240. In an embodiment of the inventive concept, the first electrode 331 may be connected as an input electrode that receives an input signal INPUT from the force sensor IC 240 (see FIG. 8), whereas the second electrode 332 may be connected as an output electrode providing an output signal to the force sensor IC 240. Each of the input signal INPUT and the output signal may include, but is not limited to, a current signal and/or a voltage signal. Although FIG. 8 illustrates that the input electrode (e.g., the first electrode 331) is disposed more to the inside of the force sensor supporting portion 311 than the output electrode (e.g., the second electrode 332), in other embodiments of the inventive concept, the input electrode may be disposed more to the outside of the force sensor supporting portion 311 than the output electrode (e.g. second electrode 332). In an initial state, where there is no conduction between the first electrode 331 and the second electrode 332, there is no output signal being provided to the force sensor IC 240.

Each of the first electrode 331 and the second electrode 332 may include a conductive material having a predetermined electrical resistance. Examples of the conductive material include metal materials such as aluminum, nickel, zinc, copper, silver and gold.

With continued reference to FIGS. 7, 8 and 9, the conductive polymer pattern 350 may be disposed between the first electrode 331 and the second electrode 332. The conductive polymer pattern 350 may be extended generally in the first direction X. In addition, the conductive polymer pattern 350 may be spaced apart from the first electrode 331 or the second electrode 332. For example, with reference to FIG. 8, when the second base 310 is not bent, the conductive polymer pattern 350 may be spaced apart from the first electrode 331 and the second electrode 332 in the second direction Y. The conductive polymer pattern 350 may be in contact with either the first electrode 331 or the second electrode 332, unlike that shown in FIG. 9 or the like. In the initial state, where no pressure is applied, there may be no conduction between the first electrode 331 and the conductive polymer pattern 350, and between the second electrode 332 and the conductive polymer pattern 350. In some embodiments of the inventive concept, the first adhesive member 710 that couples the display panel 100 with the force sensor member 301 may be in contact with the first electrode 331, the second electrode 332 and the conductive polymer pattern 350. A void may be defined in the space surrounded by the first electrode 331, the conductive polymer pattern 350 and the first adhesive member 710. For example, the space between the first electrode 331 and the conductive polymer pattern 350 may not be filled with the first adhesive member 710. The void may be empty, or may be filled with a predetermined gas. Similarly, a void may be defined in the space surrounded by the second electrode 332, the conductive polymer pattern 350 and the first adhesive member 710.

The conductive polymer pattern 350 may include a material having a certain elasticity that can be deformed by a user's touch pressure and may have electrical conductivity. In an embodiment of the inventive concept, the conductive polymer pattern 350 may include a polymer matrix 351 and conductive particles 352 dispersed in the polymer matrix 351. The type of polymer matrix 351 is not particularly limited as long as it is elastic and has a positive Poisson's ratio. For example, the polymer matrix 351 may be a polymer material such as silicone, polydimethylsiloxane and urethane. In addition, examples of the conductive particles 352 include carbon materials such as carbon nanotubes, conductive polymer particles, metal wires, metal nanofibers, and metal particles, in an embodiment of the inventive concept, the conductive polymer pattern 350 may comprise conductive polymers having a positive Poisson's ratio. As used herein, the term "Poisson's ratio" refers to the ratio of the contracted length in one direction to the expanded length in another direction when a pressure is applied to an object.

With reference to FIG. 9, in the initial state, where no pressure is applied, the initial thickness T350 of the conductive polymer pattern 350 may be greater than the initial thickness T332 of the first electrode 331 and the second electrode 332. As will be described later, when a pressure is applied to the force sensor member 301, the conductive polymer pattern 350 may become deformed so that its thickness decreases while its width increases. For example, when the pressure is applied to the conductive polymer pattern 350 of the force sensor member 301 in the third direction Z, the thickness of the conductive polymer pattern 350 in the third direction Z decreases, while the width in the second directions Y increases, so that the first electrode 331 and the second electrode 332 may come in contact with each other via the conductive polymer pattern 350. In other words, the pressure sensing direction. (e.g., the third direction Z) of the force sensor member 301 may be generally perpendicular to the direction in which the first electrode 331 and the second electrode 332 are spaced apart from each other (e.g., the second direction Y). By making the initial thickness T350 of the conductive polymer pattern 350 larger than the initial thickness T332 of the first electrode 331 and the second electrode 332, the volume of the conductive polymer pattern 350 can be increased to make contact with the first electrode 331 and the second electrode 332 when under compression, while maintaining the distance between the conductive polymer pattern 350 and the first electrode 331 and between the conductive polymer pattern 350 and the second electrodes 332. By doing so, the shape of the conductive polymer pattern 350 can be easily deformed, and the sensing sensitivity of the force sensor member 301 can be enhanced. In some embodiments of the inventive concept, the surface of the second base 310 may have a groove formed in a position overlapping the conductive polymer pattern 350. The conductive polymer pattern 350 may be disposed by being be at least partially inserted into the groove formed in the surface of the second base 310. For example, the upper surfaces of the first electrode 331, the second electrode 332 and the conductive polymer pattern 350 may come in contact with the first adhesive member 710 at the same level, while their lower surfaces may come in contact with the second base 310 at different levels.

The first force sensor pad 371 and the second force sensor pad 372 may be disposed on the force sensor pad forming portion 312 of the second base 310. The first force sensor pad 371 and the second force sensor pad 372 may electrically connect the force sensor member 301 with the printed circuit board 200. The first force sensor pad 371 may be electrically connected to the first electrode 331, and the second force sensor pad 372 may be electrically connected to the second electrode 332. The first force sensor pad 371 and the second force sensor pad 372 may be disposed on the same plane as the first electrode 331 and the second electrode 332.

Hereinafter, the operation principle of the force sensor member 301 when a pressure is applied thereto will be described in detail with reference to FIGS. 10, 11, 12, and 13.

Figure 10:
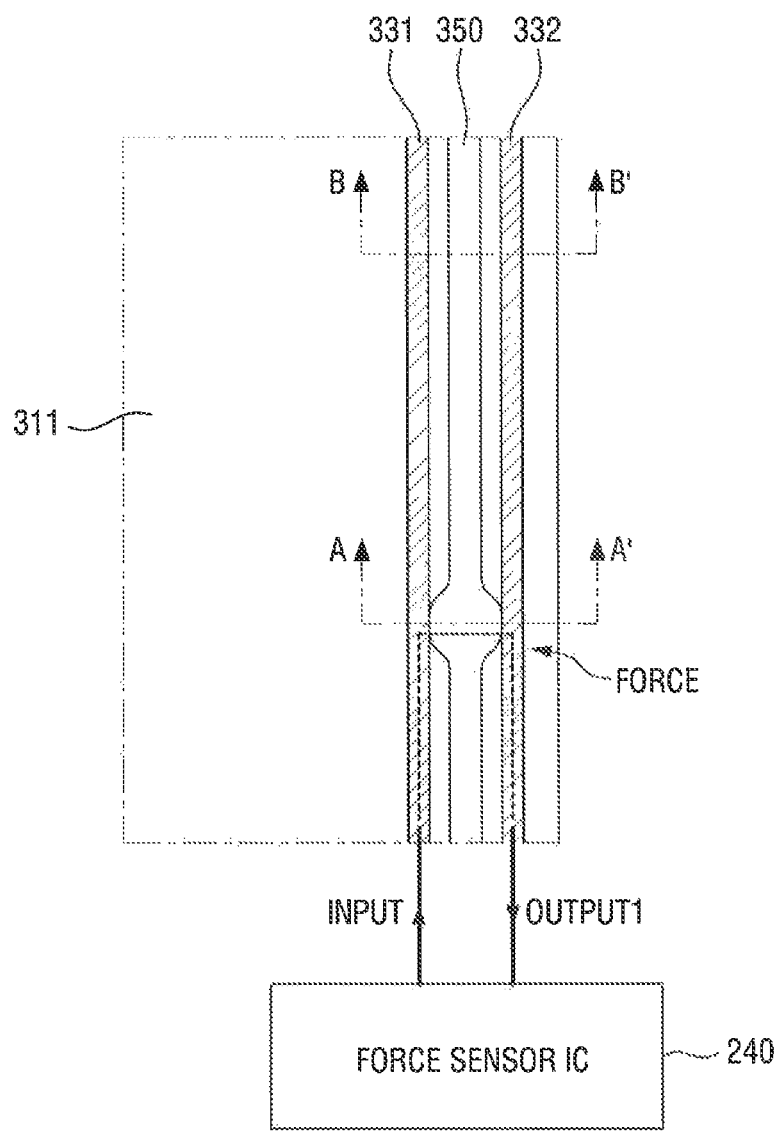
FIG. 10 is a schematic view illustrating the operation of the force sensor member when a pressure is applied to a certain position.
Figure 11:
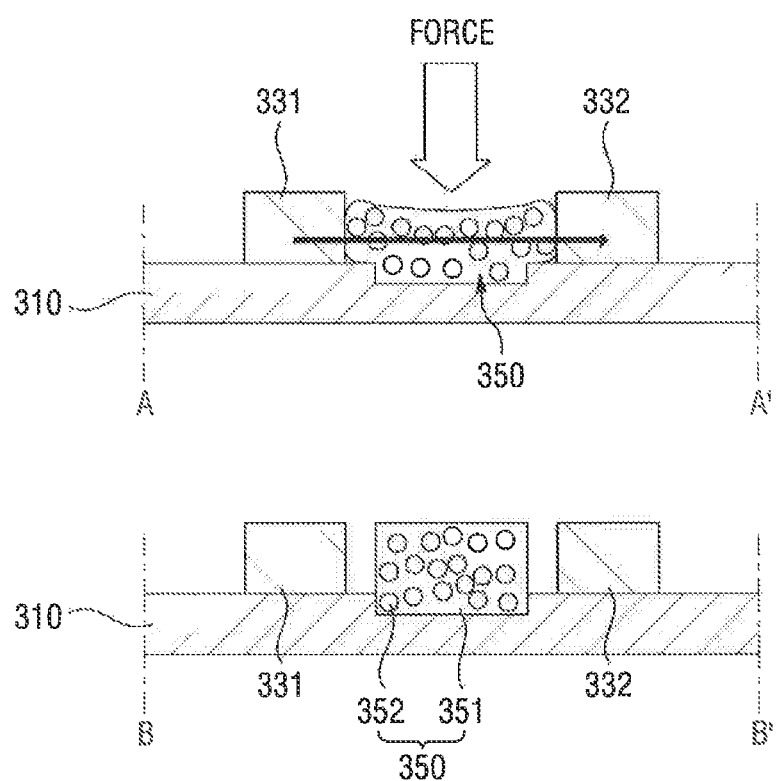
FIG. 11 is cross-sectional views taken along line A-A' and line B-B' of FIG. 10, respectively.

FIG. 10 is a view illustrating the operation of the force sensor member 301 when a pressure is applied to a particular position of the display panel, e.g., a first position relatively close to the force sensor IC 240. FIG. 11 provides cross-sectional views of the force sensor member 301 of FIG. 10, taken along line A-A' and line B-B' respectively.

Referring to FIGS. 10 and 11, when a pressure is applied to the first position (near line A-A') of the display panel that is transferred to the conductive polymer pattern 350 relatively close to the force sensor IC 240, the shape of the conductive polymer pattern 350 at the first position may be deformed such that it is expanded in the direction perpendicular to the direction in which the pressure is applied. For example, when a pressure is applied to a position of the conductive polymer pattern 350 in the third direction Z (e.g. downward) with the second base 310 not being bent, the part of the conductive polymer pattern 350 at the position may expand in the second direction Y. As a result, the part of the conductive polymer pattern 350 at the first position may come into electrical contact with the first electrode 331 and the second electrode 332 that are spaced apart in the second direction Y, such that a circuit is closed and conduction is formed between the first electrode 331 and the second electrode 332 via the conductive polymer pattern 350. For example, the first electrode 331, the conductive polymer pattern 350, the second electrode 332 and the force sensor IC 240 may complete a circuit. The force sensor IC 240 may provide an input signal INPUT to the first electrode 331, and the second electrode 332 may provide a first output signal OUTPUT1 to the force sensor IC 240. The input signal INPUT and the first output signal OUTPUT1 may include a current signal or a voltage signal. The force sensor IC 240 may acquire information on a user's touch pressure based on the input signal INPUT and the first output signal OUTPUT1, may acquire information on the user's touch position and/or may generate a signal for the operation of the display device 1 based on the information on the touch pressure and touch position. The information on the touch pressure may include information on whether a pressure has been applied to the user's touch operation and information on the magnitude of the touch pressure.

Figure 12:
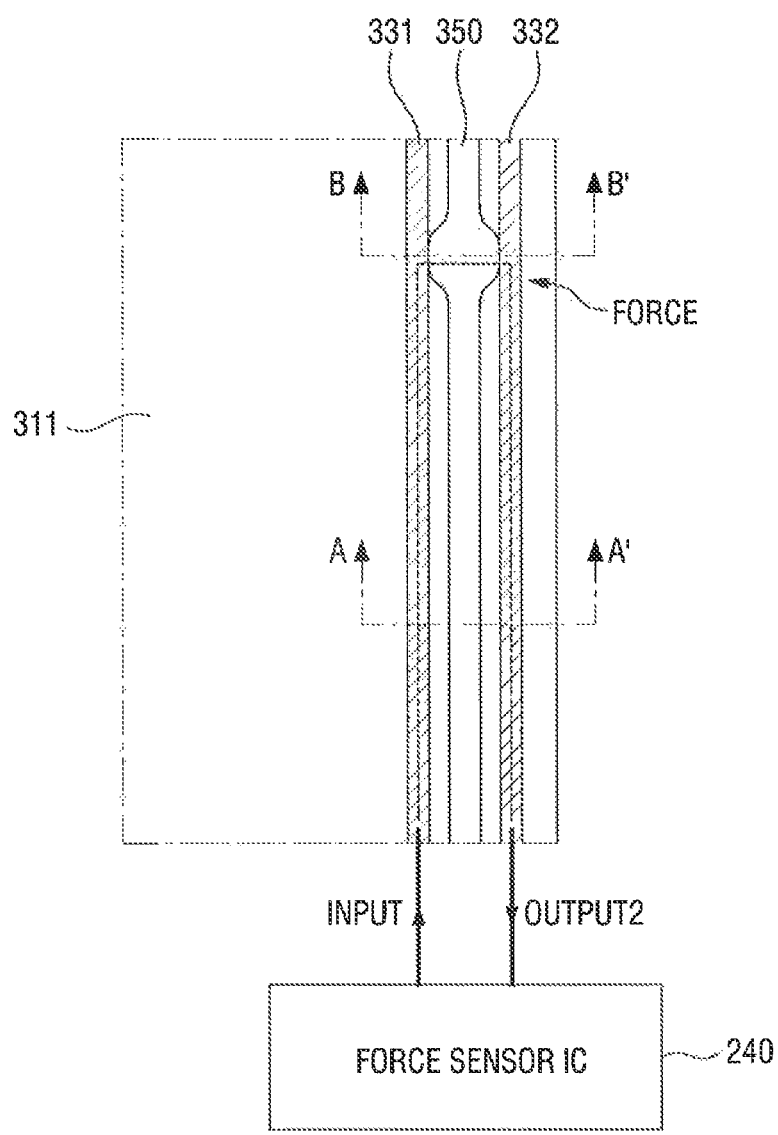
FIG. 12 is a schematic view illustrating the operation of the force sensor member when a pressure is applied to a different position.
Figure 13:
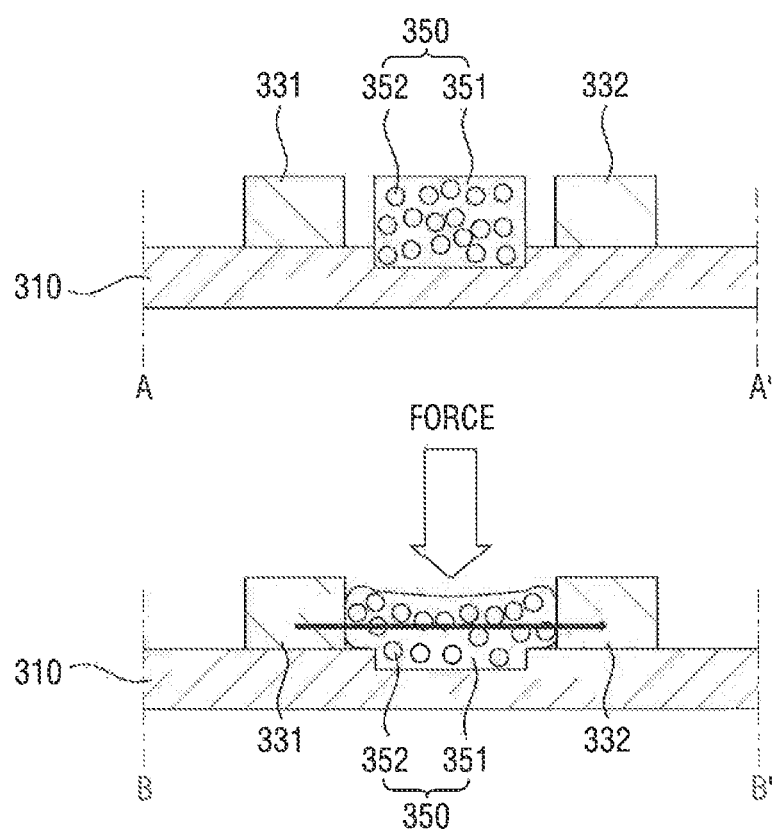
FIG. 13 is cross-sectional views taken along line A-A' and line B-B' of FIG. 12, respectively.

FIG. 12 is a view illustrating the operation of the force sensor member 301 when a pressure is applied to a different position, e.g., a second position relatively far from the force sensor IC 240. FIG. 13 is cross-sectional views of the force sensor member 301 of FIG. 12, taken along line A-A' and line B-B', respectively.

Referring to FIGS. 10, 11, 12, and 13, when a pressure is applied to the second position (near line B-B') relatively far from the force sensor IC 240, the shape of the conductive polymer pattern 350 at the second position may be deformed such that it is expanded in the direction perpendicular to the direction in which the pressure is applied. As a result, the part of the conductive polymer pattern 350 at the second position may come into electrical contact with the first electrode 331 and the second electrode 332 that are spaced apart in the second direction Y, such that conduction is formed between the first electrode 331 and the second electrode 332 via the conductive polymer pattern 350. For example, the first electrode 331, the conductive polymer pattern 350, the second electrode 332 and the force sensor IC 240 may complete a circuit. The force sensor IC 240 may provide an input signal INPUT to the first electrode 331, and the second electrode 332 may provide a second output signal OUTPUT2 to the force sensor IC 240. The force sensor IC 240 may acquire information on a user's touch pressure based on the input signal INPUT and the first output signal OUTPUT1, and/or may generate a signal for the operation of the display device 1 based on the information on the touch pressure.

Further, when a pressure is applied to a second position (relatively far position), the length of the path of the signal provided from the force sensor IC 240 may be larger than the length of the path of the signal provided from the force sensor IC 240 when a pressure is applied to the first position (relatively close position). For example, the magnitude of the second output signal OUTPUT2 provided to the force sensor IC 240 when the pressure is applied to the second position may be different from the magnitude of the first output signal OUTPUT1 provided to the force sensor IC 240 when the pressure is applied to the first position. For example, when the sheet resistance of the first electrode 331 and the second electrode 332 providing the path through which the signal is transmitted is constant, the magnitude of the resistance component formed by the circuit when the pressure is applied to the second position may be larger than the magnitude of the resistance component formed by the circuit when the pressure is applied to the first position. For example, in an embodiment of the inventive concept where the first output signal OUTPUT1 and the second output signal OUTPUT2 include a current signal, the magnitude of the second output signal OUTPUT2 may be, but is not limited to being, less than the magnitude of the first output signal OUTPUT1. While in this embodiment of the inventive concept, the magnitude of the first OUTPUT1 signal and the second OUTPUT2 signal may be used to a determine touch pressure or position, it is within an embodiment of the inventive concept to determine pressure or position based on a time the input signal is sent by the force sensor IC versus a time the output signal is received by the force sensor IC. However, determining touch or pressure or position in this way may be more complex that magnitude of the output signals OUTPUT1 and OUTPUT2.

In other words, the force sensor member 301 according to an embodiment of the of the inventive concept can acquire, based on the input signal INPUT and the output signals OUTPUT1 and OUTPUT2, information on whether a pressure is applied via a user's touch operation, or information on the magnitude of the touch pressure (touch pressure information), as well as information on the position where the pressure is applied (touch position information). Specifically, the touch position information may include coordinate information for a certain position in the first direction X. In addition, since the force sensor member 301 can acquire the touch position information together with the touch pressure information separately from the touch position sensing electrode 170 in the display panel 100, it is possible to simplify the processor for acquiring touch information and processing it to control the display device 1.

Hereinafter, other embodiments of the inventive concept will be described. The description of substantially the identical elements as in the above-described embodiment will be omitted, so as not to obscure the disclosure with repetitive information.

Figure 14:
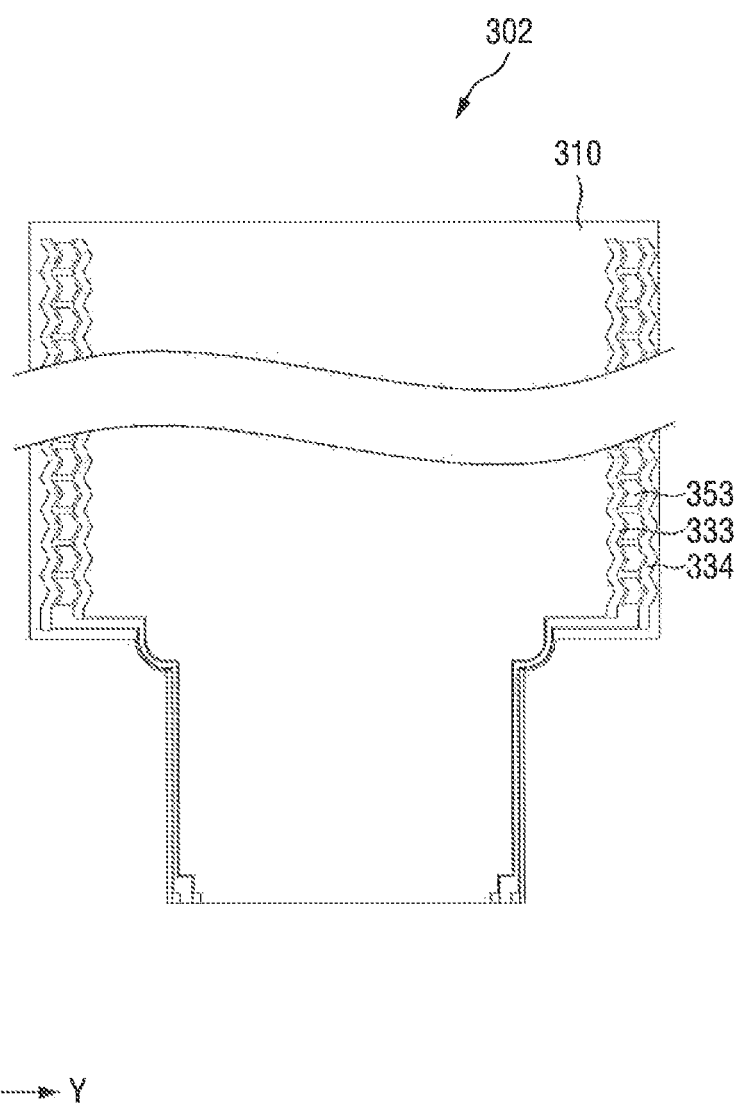
FIG. 14 is a plan view of a force sensor member according to an embodiment of the inventive concept.

FIG. 14 is a plan view of a force sensor member 302 according to an embodiment of the inventive concept when a second base 310 is not bent.

Referring to FIG. 14, the force sensor member 302 according to the embodiment of the inventive concept includes a second base 310, a first electrode 333, a second electrode 334, and a conductive polymer pattern 353 which are disposed on the second base 310. The structure shown in FIG. 14 is different from the force sensor member 301 according to the embodiment of FIG. 7 in that the first electrode 333 and the second electrode 334 have a zigzag shape. The conductive polymer pattern 353 interposed between the first electrode 333 and the second electrode 334 may have a zigzag shape as well.

The first electrode 333 and the second electrode 334 may be extended generally in the first direction X. In addition, the first electrode 333 and the second electrode 334 may be spaced apart from each other in the second direction Y when the second base 310 is not bent. The first electrode 333 may work as an input electrode receiving an input signal from the force sensor IC 240, whereas the second electrode 334 may work as an output electrode providing an output signal to the force sensor IC 240.

The conductive polymer pattern 353 may be disposed between the first electrode 333 and the second electrode 334. More than one of the conductive polymer pattern 353 may be disposed, which are spaced apart from each other. Each of the conductive polymer patterns 353 may be spaced apart from the first electrode 333 and the second electrode 334. For example, when the second base 310 is not bent, the conductive polymer patterns 353 may be spaced apart from the first electrode 333 and the second electrode 334 in the second direction Y.

According to this embodiment of the inventive concept, the first electrode 333 of the force sensor member 302 may have a zigzag shape, which traces a path between the first electrode 333 and the conductive polymer patterns 353. In addition, the second electrode 334 may have a zigzag shape, which traces a path between the second electrode 334 and the conductive polymer patterns 353. According to this embodiment of the inventive concept, the length of the signal transmission path of the circuit formed by the force sensor IC (not shown), the first electrode 333 and the second electrode 334 can be increased. By doing so, the difference between the magnitude of the first output signal generated when a touch pressure is applied to a position relatively close to the three sensor IC (not shown) and the magnitude of the second output signal generated when a touch pressure is applied to a position relatively far from the force sensor IC (not shown) can be increased. As a result, the force sensor member 302 according to the embodiment of the inventive concept can increase the sensitivity to the coordinate information for a certain position in the first direction X, e.g., the touch position information. Furthermore, since the conductive polymer patterns 353 are spaced apart from each other in the first direction X, it is possible to avoid the erroneous recognition of a user's touch position.

Although not shown in the drawings, it is to be understood that the display device may be implemented by including the force sensor member 302 according to this embodiment in place of the force sensor member 301 of the display device 1 according to the embodiment of FIG. 1 and the like.

Figure 15:
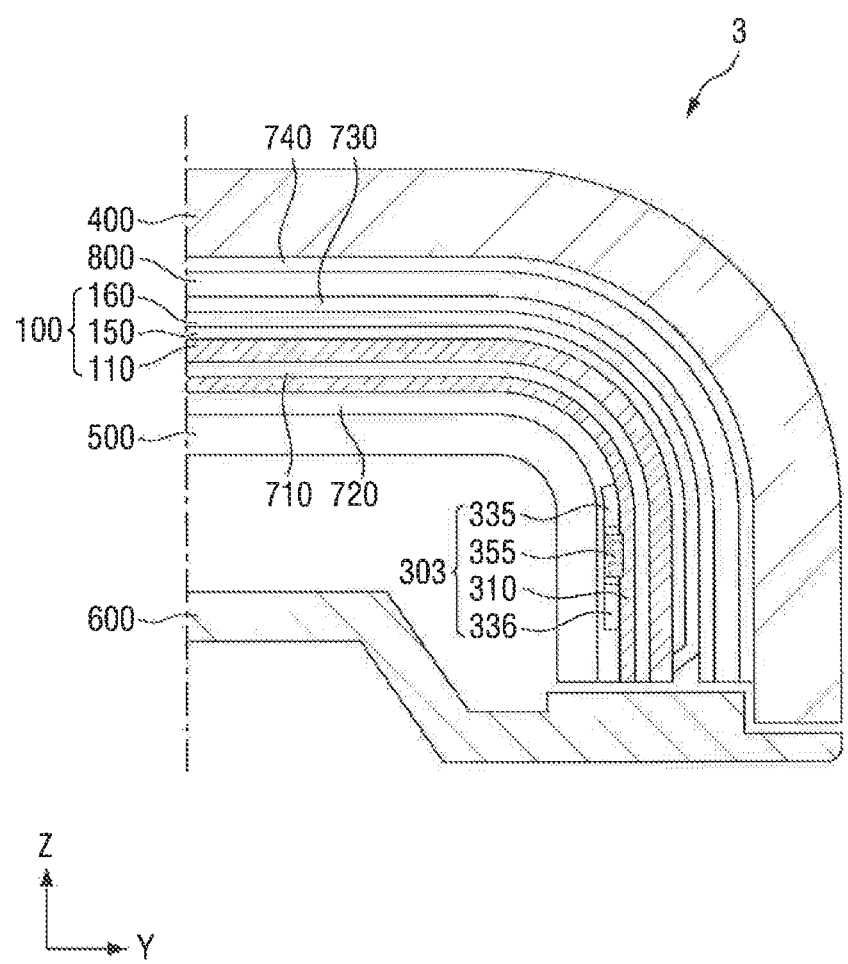
FIGS. 15 and 16 are cross-sectional views of a display device according to an embodiment of the inventive concept.
Figure 16:
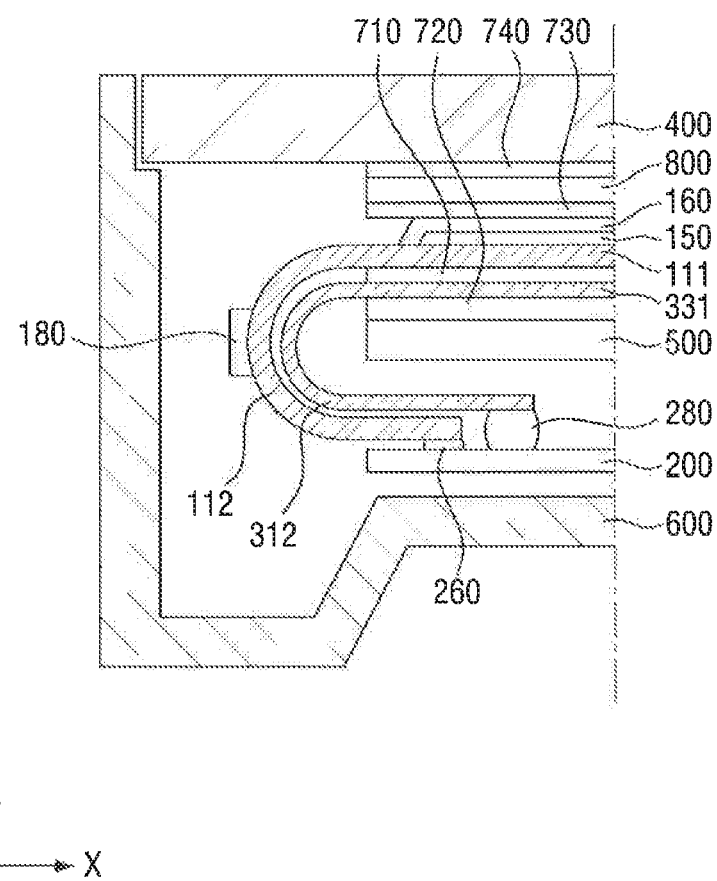
Figure 17:
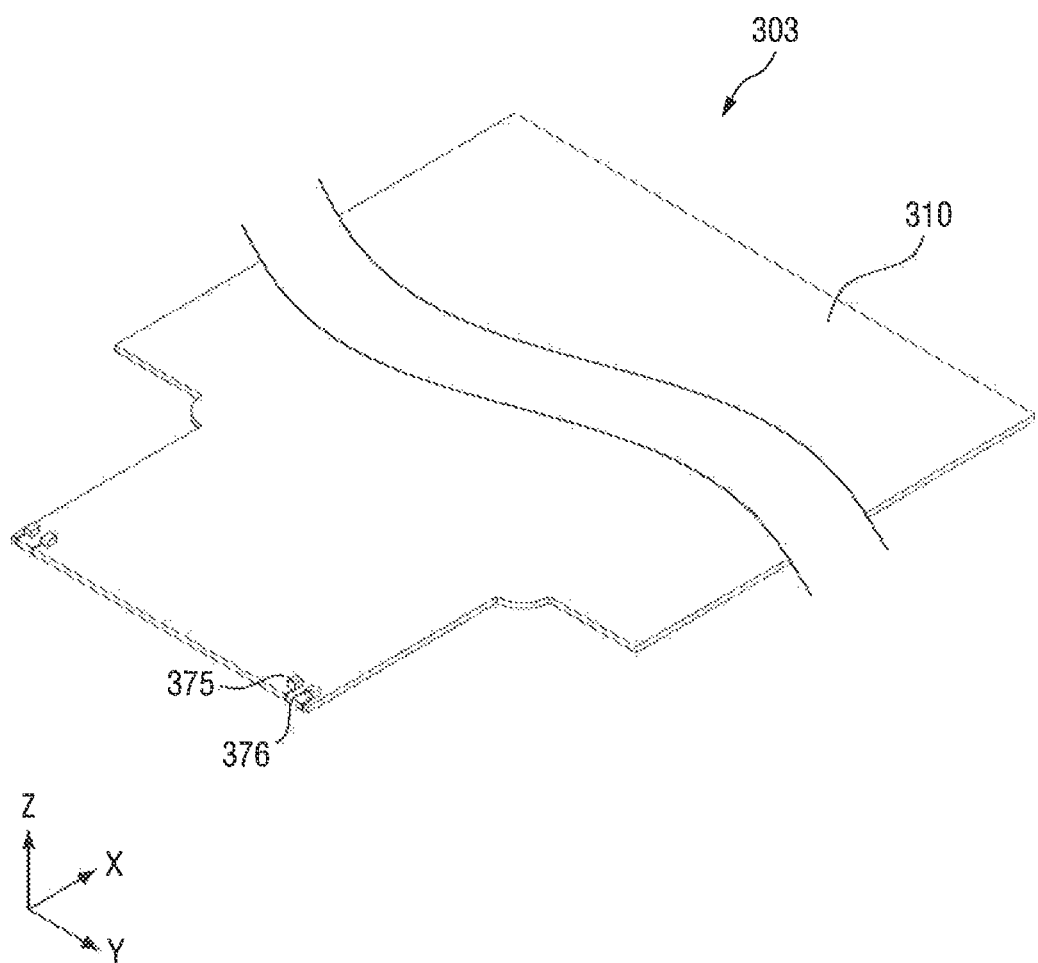
FIG. 17 is a perspective view of the force sensor member of FIG. 15.
Figure 18:
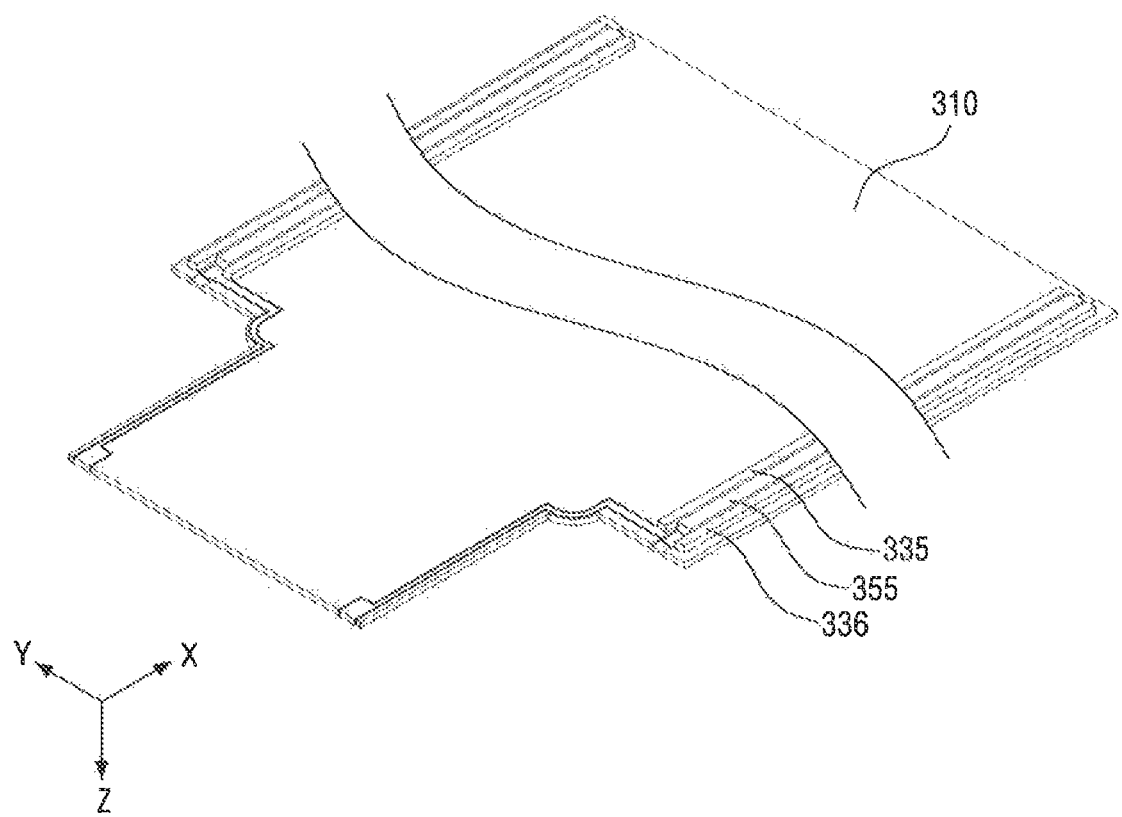
FIG. 18 is a perspective view of the rear side of the force sensor member of FIG. 15.

FIGS. 15 and 16 are cross-sectional views of a display device 3 according to another embodiment of the of the inventive concept. FIG. 15 is a cross-sectional view at the position corresponding to FIG. 2. FIG. 16 is a cross-sectional view at the position corresponding to FIG. 3. FIG. 17 is a perspective view of the force sensor member 303 of the display device 15 of FIG. 3. FIG. 18 is a perspective view of the rear side of the force sensor member 303 of the display device 3 of FIG. 15.

Referring to FIGS. 15, 16, 17 and 18, the display device 3 according to this embodiment differs from the display device 1 according to the embodiment of FIG. 1 and the like in that a first electrode 335, a second electrode 336 and a conductive polymer pattern 355 of the force sensor member 303 of the display device 3 are disposed on the rear surface of the second base 310.

The force sensor member 303 may be coupled with the display panel 100 via a first adhesive member 710. The first adhesive member 710 may be in contact with the second base 310 of the force sensor member 303 for coupling with it. Further, the force sensor member 303 may be coupled with the cushion sheet 500 via the second adhesive member 720. The second adhesive member 720 may come in contact with and be coupled to a first electrode 335, a second electrode 336 and a conductive polymer pattern 355 of the force sensor member 303. In addition, the second adhesive member 720 may be in contact with the second base 310 of the force sensor member 303 to be coupled with it.

A void may be defined in the space surrounded by the second electrode 336, the conductive polymer pattern 355 and the first adhesive member 720. A void may be defined in the space surrounded by the second electrode 336, the conductive polymer pattern 355 and the second adhesive member 720.

Although FIGS. 17 and 18 show that the second base 310 is unfolded for convenience of illustration, the second base 310 may be partially bent. In an embodiment of the inventive concept, the first force sensor pad 375 and the second force sensor pad 376 may be disposed on the front surface (the front surface in FIG. 17) of the force sensor pad forming portion 312 of the second base 310. In addition, the first electrode 335, the second electrode 336 and the conductive polymer pattern 355 may be disposed on the rear surface (shown in FIG. 18) of the force sensor supporting portion of the second base 310. The first force sensor pad 375 on the front surface of the second base 310 may be electrically connected to the first electrode 335 on the rear surface of the second base 310, and the second force sensor pad 376 on the front surface of the second base 310 may be electrically connected to the second electrode 336 on the rear surface of the second base 310. Although FIGS. 17 and 18 illustrate that the wiring connecting the first electrode 335 with the first force sensor pad 375 and the wiring connecting the second electrode 336 with the second force sensor pad 376 are formed on the side surface of the second base 310, such that the second base 310 is bypassed, this structure is merely illustrative. For example, the first electrode 335 and the first force sensor pad 375, and the second electrode 336 and the second force sensor pad 376 may be electrically connected to each other through the second base 310.

Figure 19:
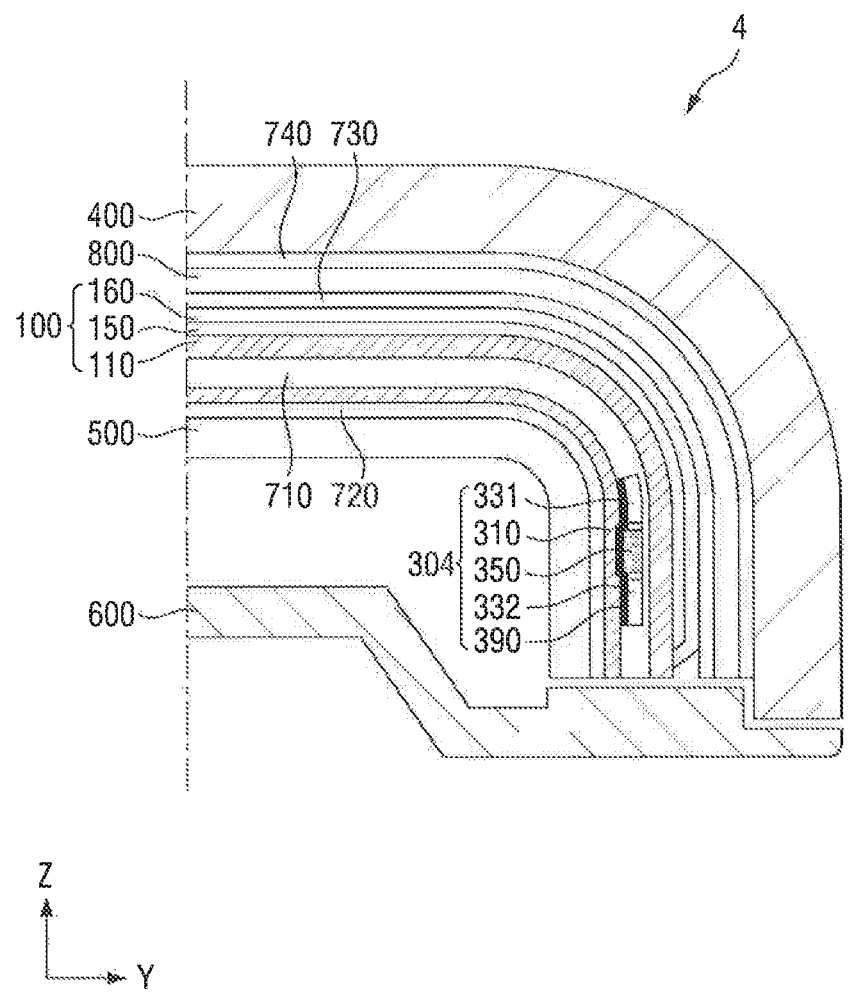
FIG. 19 is a cross-sectional view of a display device according to an embodiment of the inventive concept.
Figure 20:
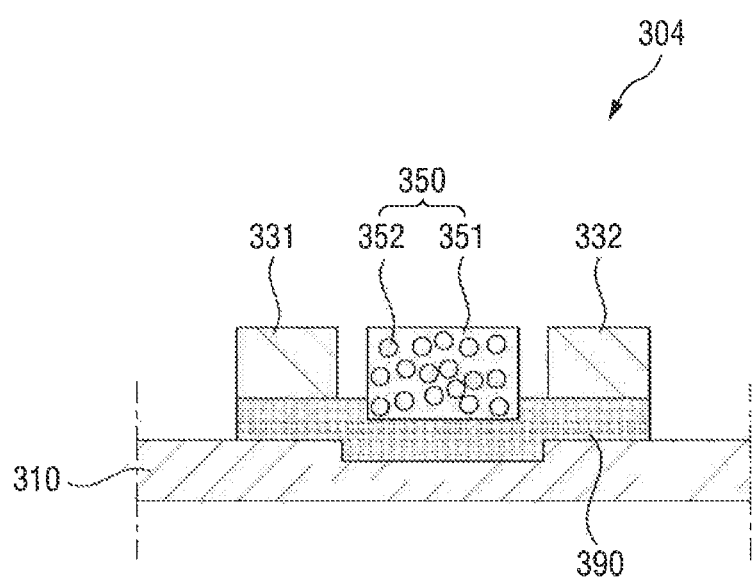
FIG. 20 is a cross-sectional view of the force sensor member of FIG. 19 in an initial state.
Figure 21:
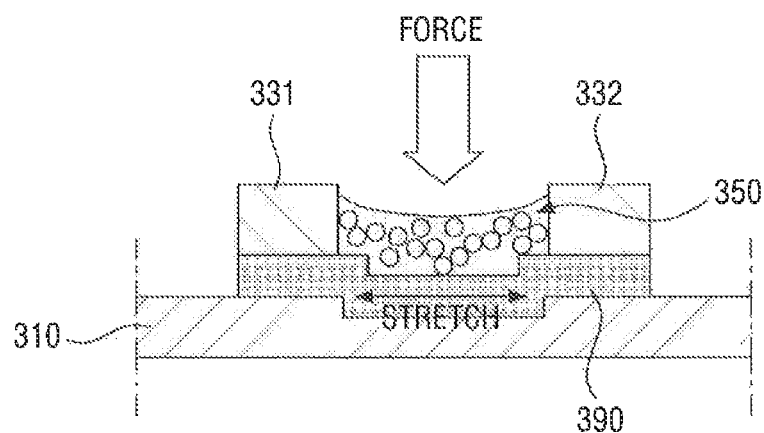
FIG. 21 is a cross-sectional view of the force sensor member of FIG. 19 when a pressure is applied.

FIG. 19 is a cross-sectional view of a display device 4 according to an embodiment of the inventive concept, which shows the position corresponding to FIG. 2. FIG. 20 is a cross-sectional view of the force sensor member 304 of FIG. 19 in an initial state where no pressure is applied. FIG. 21 is a cross-sectional view of the force sensor member 304 of FIG. 19 when a pressure is applied and the conductive polymer 350 makes electrical contact with the first electrode 331 and the second electrode 332.

Referring to FIGS. 19, 20 and 21, the display device 4 according to this embodiment is different from the display device 1 according to the embodiment of FIG. 1 and the like in that a force sensor member 304 further includes a rigid anisotropic material layer 390 disposed on a second base 310.

The rigid anisotropic material layer 390 may be disposed on the second base 310. In an embodiment where the surface of the second base 310 has a groove, the groove may be filled with the rigid anisotropic material layer 390. The rigid anisotropic material layer 390 may come in electrical contact with the conductive polymer pattern 350. For example, the rigid anisotropic material layer 390 may at least partially overlap the conductive polymer pattern 350.

In addition, in the initial state, where no pressure is applied, the width of the rigid anisotropic material layer 390 may be larger than the width of the conductive polymer pattern 350. For example, the rigid anisotropic material layer 390 may overlap with a spacing between the conductive polymer pattern 350 and the first electrode 331 and/or a spacing between the conductive polymer pattern 350 and the second electrode 332. Furthermore, the rigid anisotropic material layer 390 may come in electrical contact with the first electrode 331 and/or the second electrode 332.

The rigid anisotropic material layer 390 may have an electrically insulating property. In addition, the rigid anisotropic material layer 390 has a predetermined elasticity, and its rigidity and length strain against pressure may be different when pressure is applied in different directions. In an embodiment of the inventive concept, the rigidity of the rigid anisotropic material layer 390 in the pressure direction (e.g., vertical direction of FIG. 20) may be larger than the rigidity thereof in a direction perpendicular to the pressure direction (e.g., horizontal direction of FIG. 20). In other words, the strain in the thickness direction of the rigid anisotropic material layer 390 may be smaller than the strain in the width direction. In a non-limiting example, the rigid anisotropic material layer 390 may be comprised of an auxetic material with a negative Poisson ratio. In a particular embodiment, the anisotropic material layer may be constructed of the auxetic material.

Examples of the auxetic material may include, but are not limited to, polyester foam, polyurethane foam, polyester urethane foam, polytetrafluoroethylene (PTFE) foam, ultra-high molecular weight polyethylene (UHMWPE) having a molecular weight of 1 million or more, polypropylene (PP) foam, polypropylene fiber, nylon foam, liquid-crystalline polymer foam, etc.

By way of a non-limiting example, the auxetic material may have a normal honeycomb structure, a star-honeycomb structure, a hexagonal re-entrant honeycomb structure, a chiral honeycomb structure, a double-arrowhead structure, a square grid structure, a lozenge grid structure, a sinusoidal ligament structure, a symmetric chiral unit structure, or the like.

The force sensor member 304 of the display device 4 according to this exemplary embodiment may include a rigid anisotropic material layer 390 whose rigidity in the thickness direction is greater than the rigidity in the width direction. Specifically, by disposing the rigid anisotropic material layer 390 between the second base 310 and the conductive polymer pattern 350, which expands in the width direction when the pressure is applied in the thickness direction to come in contact with the first electrode 331 and the second electrode 332, the sensitivity of the force sensor member 304 can be further increased.

For example, when a pressure is applied to the force sensor member 304 in the thickness direction, the strain of the rigid anisotropic material layer 390 in the thickness direction that overlaps with the conductive polymer pattern 350 in the thickness direction may be relatively small. Accordingly, it is possible to facilitate the pressure applied in the thickness direction to be more easily transmitted in the width direction of the conductive polymer pattern 350 than if there was not a rigid anisotropic material layer 390 arranged as shown in FIGS. 20 and 21.

In addition, the strain in the width direction of the rigid anisotropic material layer 390 that overlaps with the conductive polymer pattern 350 in the thickness direction may be relatively large. According to embodiments of the inventive concept, it is possible to facilitate the pressure transmitted in the width direction of the conductive polymer pattern 350 to spread in the width direction of the conductive polymer pattern 350. In addition, the electrical contact area between the conductive polymer pattern 350 and the first electrode 331 and the contact area between the conductive polymer pattern 350 and the second electrode 332 can be increased.

Figure 22:
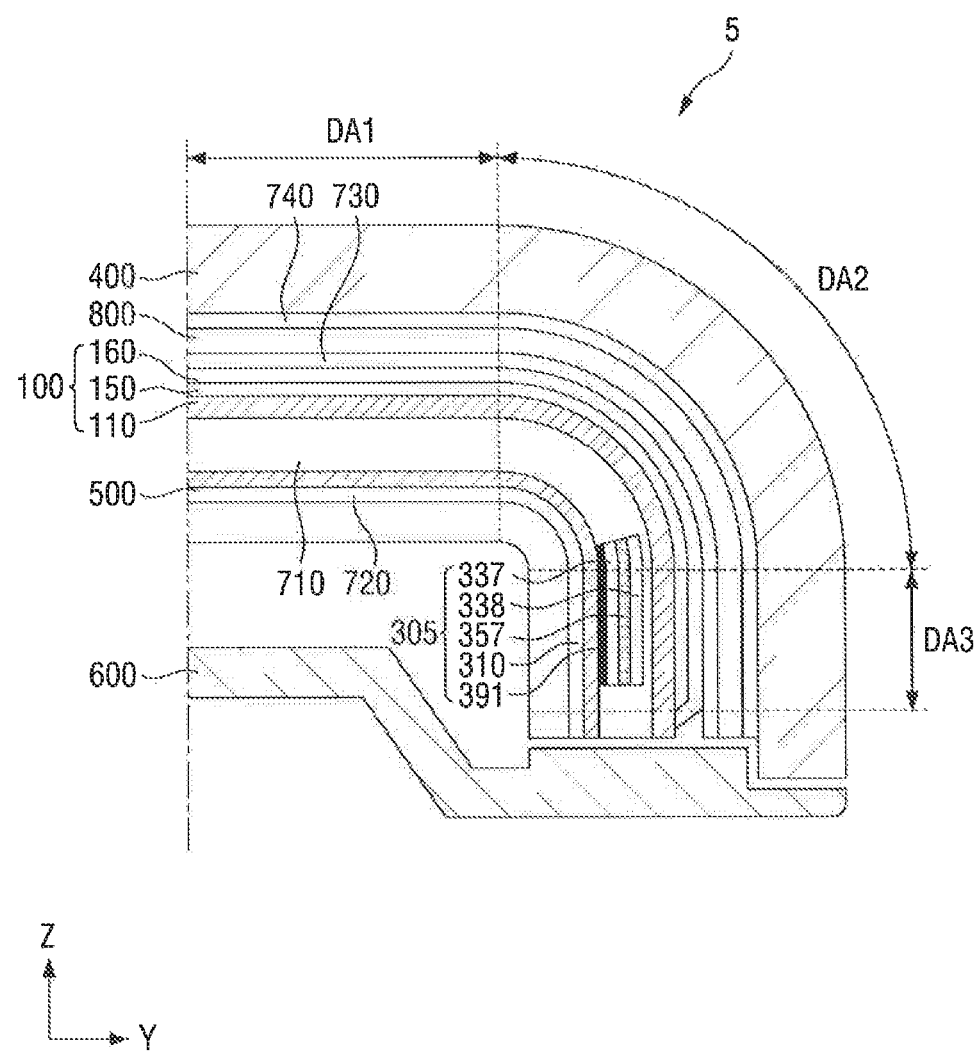
FIG. 22 is a cross-sectional view of a display device according to an embodiment of the inventive concept.
Figure 23:
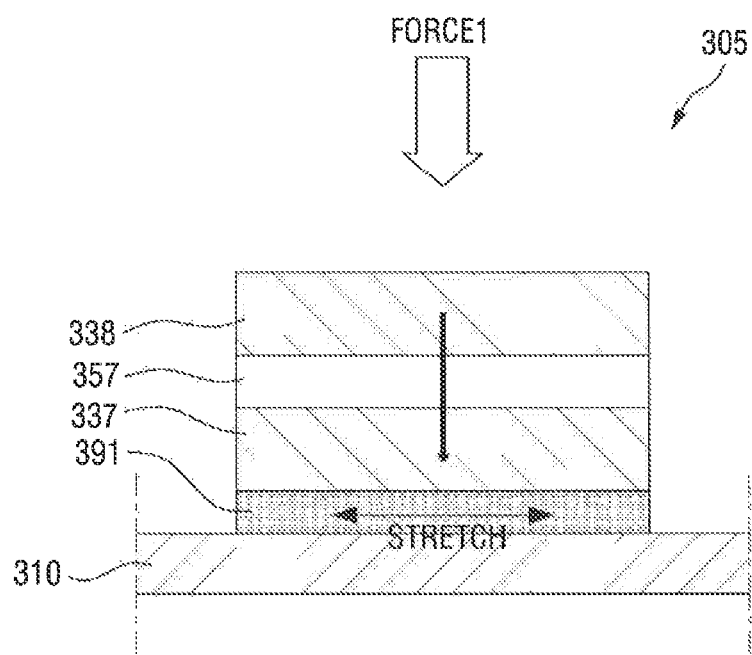
FIGS. 23 and 24 are cross-sectional views of the force sensor member of FIG. 22 when pressures are applied, respectively.
Figure 24:
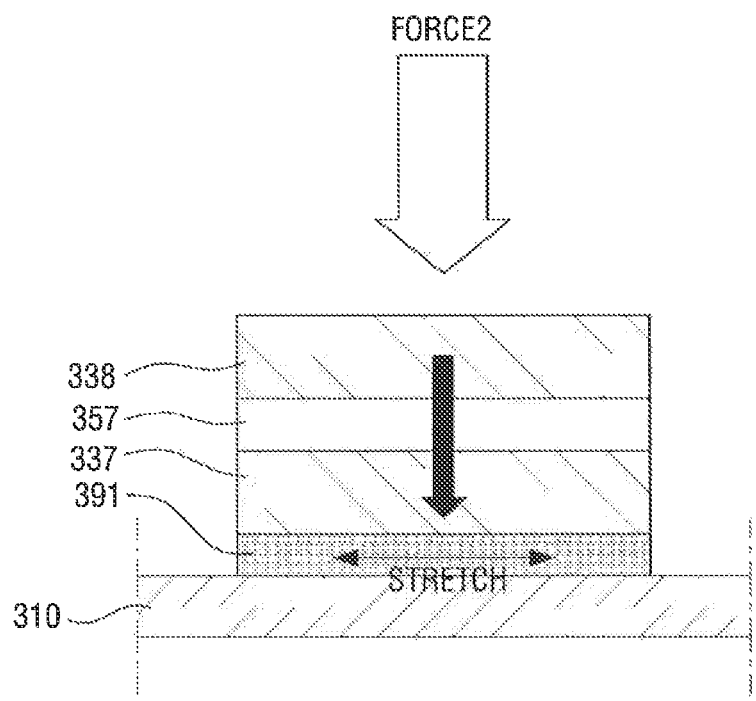

FIG. 22 is a cross-sectional view of a display device 5 according to another embodiment of the inventive concept, which shows the position corresponding to FIG. 2. FIG. 23 is a cross-sectional view of the three sensor member 305 in a first pressure state where a pressure of a first magnitude is applied to the force sensor member 305 of the display device 5 of FIG. 22. FIG. 24 is a cross-sectional view of the force sensor member 305 in a second pressure state where a pressure of a second magnitude, which is larger than the first magnitude (by comparing the arrows), is applied to the three sensor member 305 of the display device 5 of FIG. 22.

Referring to FIGS. 22, 23 and 24, the display device 5 according to this embodiment is different from the display device 1 according to the embodiment of FIG. 1 and the like in that a force sensor member 305 includes a second base 310, a rigid anisotropic material layer 391, a first electrode 337, a second electrode 338 and a piezoelectric material layer 357. A conductive polymer pattern in previous embodiments has been replaced by the piezoelectric material layer 357.

A first adhesive member 710 may be interposed between the display panel 100 and the force sensor member 305. For example, the first adhesive member 710 may come in contact with and be coupled with the first base 110 of the display panel 100, the second electrode 338 of the force sensor member 305, the piezoelectric material layer 357, the first electrode 337, the rigid anisotropic material layer 391, and the second base 310.

The rigid anisotropic material layer 391 may be disposed on the second base 310 of the force sensor member 305. When a pressure is applied to the force sensor member 305 in the thickness direction, the rigid anisotropic material layer 391 having a relatively small strain in the thickness direction can facilitate the pressure to be transmitted in the width direction. The rigid anisotropic material layer 391 has been described above with reference to FIG. 19 and the like; and, therefore, the redundant description will be omitted.

The first electrode 337 may be disposed on the rigid anisotropic material layer 391. For example, the first electrode 337 may be disposed directly on the rigid anisotropic material layer 391. The second electrode 338 may be spaced apart from the first electrode 337 in the pressure direction (e.g., the vertical direction of FIG. 23). For example, the pressure sensing direction (e.g., the vertical direction) of the force sensor member 305 may generally coincide with the direction in which the first electrode 337 is spaced apart from the second electrode 338.

In the initial state, where no pressure is applied, there may be conduction between the first electrode 337 and the second electrode 338. For example, the first electrode 337 and the second electrode 338 may complete a circuit with the piezoelectric material layer 357 therebetween and may transmit signals. Each of the first electrode 337 and the second electrode 338 may include a conductive material having a predetermined electrical resistance. Examples of the conductive material include metal materials such as aluminum, nickel, zinc, copper, silver and gold.

The piezoelectric material layer 357 may be interposed between the first electrode 337 and the second electrode 338. The piezoelectric material layer 357 may overlap with the first electrode 337 and the second electrode 338 in the thickness direction and may come in contact with the first electrode 337 and the second electrode 338. The piezoelectric material layer 357 may include a piezoelectric material that generates a voltage when its shape is deformed or vice versa. For example, the piezoelectric material layer 357 may include an inorganic material such as PZT (lead zirconate titanate, Pb[ZrxTi1-x]O$_3$) including zirconium salt (PbZrO$_3$), titanate (PbTiO$_3$), etc., α-iron oxide (α-Fe$_2$O$_3$), α-aluminum phosphate (α-AlPO$_4$), α-silicon oxide (α-SiO$_2$), barium titanate (BaTiO$_3$), lithium tantalate (LiTaO$_3$) and lithium niobate (LiNbO$_3$), organic material such as polyvinylidene fluoride (PVDF), poly(vinylidene fluoride-trifluoroethylene), P(VDF-TrFE), poly(vinylidene fluoride-tetrafluoro, P(VDF-TeFE)) and triglycine sulfate (TGS), or a composite material of the inorganic material and the organic material.

For example, in a first pressure state, where a pressure of a first magnitude is applied to the force sensor member 305, a voltage of a certain level may be generated on the surface of the piezoelectric material layer 357 as the piezoelectric material layer 357 is contracted, such that a first signal may be transmitted through the second electrode 338, the piezoelectric material layer 357 and the first electrode 337. In addition, in a second pressure state where a pressure of a second magnitude is applied to the force sensor member 305, a voltage of a different level may be generated on the surface of the piezoelectric material layer 357 as the piezoelectric material layer 357 is contracted more than in the first pressure state, such that a second signal may be transmitted through the second electrode 338, the piezoelectric material layer 357 and the first electrode 337.

The force sensor member 305 of the display device 5 according to this embodiment may acquire information on whether a pressure is applied to a user's touch operation or information on the magnitude of the touch pressure based on the piezoelectric properties of the piezoelectric material layer 357. In particular, by disposing the rigid anisotropic material layer 391 between the second base 310 supporting the first electrode 337 and the first electrode 337, the sensitivity of the force sensor member 305 can be further increased.

Embodiments of the inventive concept described herein are illustrative, and many variations can be introduced without departing from the spirit of the disclosure or from the scope of the appended claims. For example, elements and/or features of different embodiments of the inventive concept may be combined with each other and/or substituted for each other within the scope of this disclosure and appended claims.

What is claimed is:

1. A display device comprising:
  a display panel including a first base, and a light-emitting element disposed on the first base; and
  a force sensor member disposed on a rear surface of the display panel and overlapping with the display panel,
  wherein the force sensor member comprises:
  a second base;
  a first electrode and a second electrode disposed on the second base and spaced apart from each other in a horizontal direction with respect to an upper surface of the second base,
  wherein the first electrode extends in a first lengthwise direction different from the horizontal direction, and
  wherein the second electrode extends in a second lengthwise direction which is parallel to the first lengthwise direction, and
  a conductive polymer pattern disposed between the first electrode and the second electrode on the second base,
  wherein the conductive polymer pattern, the first electrode, and the second electrode are spaced apart, in the horizontal direction, from each other on the second base.

2. The display device of claim 1, further comprising:
  a window glass disposed apart from the force sensor member with a front surface of the display panel interposed therebetween;
  a cushion sheet disposed apart from a rear surface of the display panel with the force sensor member interposed therebetween; and
  a first adhesive member configured to couple the display panel with the force sensor member and contact the first electrode and the second electrode.

3. The display device of claim 1, further comprising:
  a window glass disposed apart from the force sensor member with the display panel interposed therebetween;
  a cushion sheet disposed apart from the display panel with the force sensor member interposed therebetween; and
  a second adhesive member configured to couple the force sensor member with the cushion sheet and to be in contact with the first electrode and the second electrode.

4. The display device of claim 1, wherein the force sensor member further comprises:
  a rigid anisotropic material layer disposed on the second base,
  wherein the first electrode is disposed on the rigid anisotropic material layer,
  the second electrode is disposed on the rigid anisotropic material layer, and
  the conductive polymer pattern is disposed directly on the rigid anisotropic material layer, and
  wherein a width of the rigid anisotropic material layer is greater than a width of the conductive polymer pattern.

5. The display device of claim 4, wherein the rigid anisotropic material layer is made of an auxetic material having an insulating property, and
wherein a rigidity of the rigid anisotropic material layer in a pressure direction is greater than a rigidity thereof in a direction perpendicular to the pressure direction.

6. The display device of claim 1, wherein a void is defined between the first electrode and the conductive polymer pattern, and between the second electrode and the conductive polymer pattern.

7. The display device of claim 6,
wherein, in an initial state without pressure being applied to a display surface of the display panel, a thickness of the conductive polymer pattern is greater than a thickness of the first electrode and a thickness of the second electrode.

8. The display device of claim 6,
wherein the force sensor member further comprises a second base for providing a space where the first electrode, the second electrode and the conductive polymer pattern are disposed,
wherein a surface of the second base has a groove overlapping with the conductive polymer pattern.

9. The display device of claim 1,
wherein the first electrode and the second electrode each are extended in a first direction,
wherein the first electrode and the second electrode are spaced apart from each other in a second direction intersecting with the first direction,
wherein the force sensor member acquires a user's touch pressure information and touch position information,
wherein the touch position information comprises coordinates of a position in the first direction, and
wherein the touch pressure information comprises a value of pressure in a direction intersecting with the first direction and the second direction.

10. The display device of claim 9, further comprising:
a force sensor IC configured to send an input signal to the first electrode of the force sensor member and receive an output signal from the second electrode,
wherein a magnitude of a first output signal sent to the force sensor IC when a pressure is applied to a first position of the force sensor member in the first direction is different from a magnitude of a second output signal sent to the force sensor IC when the pressure is applied to a second position of the force sensor member in the first direction.

11. The display device of claim 9, wherein the conductive polymer pattern comprises a plurality of conductive polymer patterns, wherein each one of the plurality of the conductive polymer patterns are spaced apart from one another in the first direction.

12. The display device of claim 9, wherein the first electrode has a zigzag shape tracing a path between the first electrode and the conductive polymer pattern, and
wherein the second electrode has a zigzag shape tracing a path between the second electrode and the conductive polymer pattern.

13. The display device of claim 1, further comprising:
a force sensor integrated circuit IC electrically connected to the first electrode and the second electrode, the force sensor IC is configured to provide an input signal to the first electrode of the force sensor member, wherein in an initial state where no pressure is applied to the display panel there is no conductive path between the first electrode, the second electrode and the force sensor IC.

14. The display device of claim 13, wherein, in a state where a pressure is applied to the display panel, the conductive polymer pattern contacts the first electrode and the second electrode to provide a conductive path between the first electrode, and the conductive polymer pattern, the second electrode and the force sensor IC,
wherein the force sensor IC receives an output signal from the second electrode, and
wherein the force sensor member acquires touch pressure information and touch position information based on the input signal provided to the first electrode and the output signal received from the second electrode.

15. The display device of claim 13, further comprising:
a printed circuit board for providing image signals to the display panel to display images,
wherein the force sensor IC is mounted on the printed circuit board.

16. The display device of claim 15, wherein the display panel further comprises:
a display panel pad disposed on the first base and electrically connected to the light-emitting element,
wherein the force sensor member comprises:
a second base providing a space where the first electrode, the second electrode and the conductive polymer pattern are disposed,
a first force sensor pad disposed on the second base and electrically connected to the first electrode, and
a second force sensor pad disposed on the second base and electrically connected to the second electrode, and
wherein the display panel pad, the first force sensor pad and the second force sensor pad are electrically connected to the printed circuit board.

17. The display device of claim 1, wherein a display area of the display panel comprises a first display area having a flat surface and a second display area having a curved surface, and
wherein the first electrode or the second electrode is at least partially located in the second display area.

18. A display device comprising:
a display panel comprising a light-emitting element; and
a force sensor member overlapping with a rear of the display panel,
wherein the force sensor member includes:
a base,
a rigid anisotropic material layer disposed on the base,
a first electrode disposed directly on the rigid anisotropic material layer,
a second electrode disposed on the base and spaced apart, in a horizontal direction with respect to an upper surface of the base, from the first electrode
wherein the first electrode extends in a first lengthwise direction different from the horizontal direction, and
wherein the second electrode extends in a second lengthwise direction which is parallel to the first lengthwise direction, and
a piezoelectric material interposed between the first electrode and the second electrode,
wherein the first electrode, the piezoelectric material and the second electrode are spaced apart, in the horizontal direction, from each other, and
wherein the piezoelectric material is configured to generate, in response to force applied to the force sensor member, a voltage.

19. The display device of claim 18,
wherein the force sensor member acquires pressure information in a direction in which the first electrode is spaced apart from the second electrode,
wherein the rigid anisotropic material layer is comprised of an auxetic material having an insulating property, and
wherein a rigidity of the rigid anisotropic material layer is larger in a pressure direction than in a direction perpendicular to the pressure direction.

20. A force sensor member comprising:
a base;
a rigid anisotropic material layer disposed on the base, wherein the rigid anisotropic material layer is made of an auxetic material having an insulating property;
a first electrode disposed on the base and in contact with the rigid anisotropic material layer; and
a second electrode disposed on the base and spaced apart from the first electrode with the rigid anisotropic material layer therebetween,
wherein the first electrode extends in a first lengthwise direction,
wherein the second electrode extends in a second lengthwise direction which is parallel to the first lengthwise direction, and
wherein the first electrode, the rigid anisotropic material layer and the second electrode are spaced apart from each other in a horizontal direction different from the first lengthwise direction.

* * * * *